(12) United States Patent
Shimezawa et al.

(10) Patent No.: US 9,172,448 B2
(45) Date of Patent: Oct. 27, 2015

(54) BASE-STATION APPARATUS, TERMINAL APPARATUS, COMMUNICATION SYSTEM, AND COMMUNICATION METHOD

(75) Inventors: Kazuyuki Shimezawa, Osaka (JP); Toshizo Nogami, Osaka (JP); Kimihiko Imamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 150 days.

(21) Appl. No.: 13/976,594

(22) PCT Filed: Dec. 22, 2011

(86) PCT No.: PCT/JP2011/079785
§ 371 (c)(1),
(2), (4) Date: Jun. 27, 2013

(87) PCT Pub. No.: WO2012/090851
PCT Pub. Date: Jul. 5, 2012

(65) Prior Publication Data
US 2013/0272250 A1    Oct. 17, 2013

(30) Foreign Application Priority Data
Dec. 27, 2010    (JP) .................. 2010-289663

(51) Int. Cl.
*H04B 7/04*    (2006.01)
*H04B 7/06*    (2006.01)
(Continued)

(52) U.S. Cl.
CPC .............. *H04B 7/0456* (2013.01); *H04B 7/024* (2013.01); *H04B 7/063* (2013.01); *H04B 7/0626* (2013.01); *H04B 7/0639* (2013.01);
(Continued)

(58) Field of Classification Search
CPC .... H04B 7/0639; H04B 7/0417; H04B 7/063; H04B 7/0456; H04B 7/0634
See application file for complete search history.

(56) References Cited

U.S. PATENT DOCUMENTS 8,249,511 B2 *   8/2012   Liu et al. ............... 455/63.1
2010/0142633 A1 *  6/2010   Yu et al. ............... 375/260
(Continued)

FOREIGN PATENT DOCUMENTS

WO    2012/005476 A2    1/2012
WO    2012/022100 A1    2/2012

OTHER PUBLICATIONS

3GPP TSG RAN WG1 #62bis, "Further Details on UE-Specific Codebook Subset Restriction"; Oct. 11-15, 2010; 6 pages.
(Continued)

*Primary Examiner* — Jamal Javaid
(74) *Attorney, Agent, or Firm* — Keating & Bennett, LLP

(57) ABSTRACT

A base-station apparatus configures a terminal apparatus with information related to mapping between a first channel-state information reference signal and a second channel-state information reference signal and codebook subset restriction information that restricts selection of a codebook subset as feedback information by the terminal apparatus, the codebook subset indicating a weight to perform a first communication and a second communication. Using the information related to the mapping and the codebook subset restriction information, the terminal apparatus selects a codebook to perform the first communication and a codebook to perform the second communication. The terminal apparatus configures the base-station apparatus with information indicating the codebook to perform the first communication and information indicating the codebook to perform the second communication.

7 Claims, 10 Drawing Sheets

(51) Int. Cl.
 H04B 7/02 (2006.01)
 H04L 5/00 (2006.01)
(52) U.S. Cl.
 CPC .......... H04B 7/0665 (2013.01); H04L 5/0016 (2013.01); H04L 5/0023 (2013.01); H04L 5/0035 (2013.01); H04L 5/0051 (2013.01); H04L 5/0057 (2013.01)

(56) References Cited

U.S. PATENT DOCUMENTS

| | | | |
|---|---|---|---|
| 2011/0034192 A1* | 2/2011 | Lim et al. | 455/501 |
| 2013/0114763 A1 | 5/2013 | Park | |
| 2013/0136203 A1 | 5/2013 | Chen et al. | |

OTHER PUBLICATIONS

3GPP TSG RAN WG1 #63, "Codebook Subset Restriction for 8-Tx Codebook"; Nov. 15-19, 2010; 5 pages.

Official Communication issued in International Patent Application No. PCT/JP2011/079785, mailed on Mar. 19, 2012.

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814, V9.0.0, Mar. 2010, 104 pages.

"3rd Generation Partnership Project;Technical Specification Group Radio Access Network; Evolved Universal Terrestrial Radio Access (E-UTRA); physical layer procedures (Release 9)", 3GPP TS 36.213, V9.3.0, Sep. 2010, 80 pages.

* cited by examiner

|  |  | RANK | |
|---|---|---|---|
|  |  | 1 | 2 |
| CODEBOOK INDEX | 0 | W10 | - |
|  | 1 | W11 | W21 |
|  | 2 | W12 | W22 |
|  | 3 | W13 | - |

|  |  | RANK | | | | | | | |
|---|---|---|---|---|---|---|---|---|---|
|  |  | 1 | 2 | 3 | 4 | 5 | 6 | 7 | 8 |
| PORT COUNT: 2 | W | 4 | 2 | - | - | - | - | - | - |
| PORT COUNT: 4 | W | 16 | 16 | 16 | 16 | - | - | - | - |
| PORT COUNT: 8 | $W_1$ | 16 | 16 | 4 | 4 | 4 | 4 | 4 | 1 |
|  | $W_2$ | 16 | 16 | 16 | 8 | - | - | - | - |

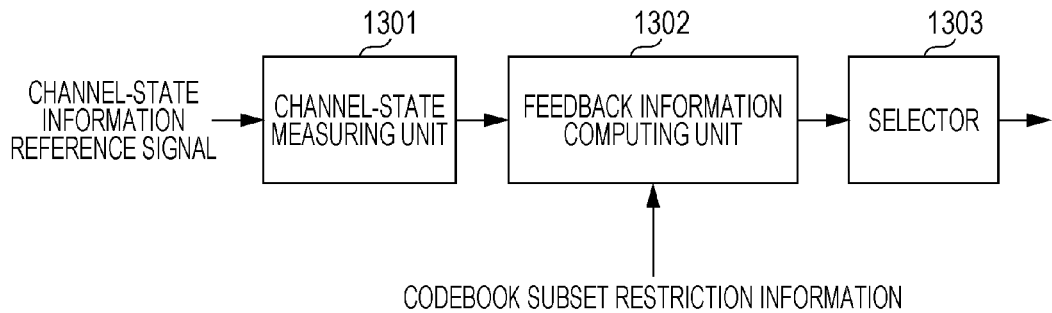
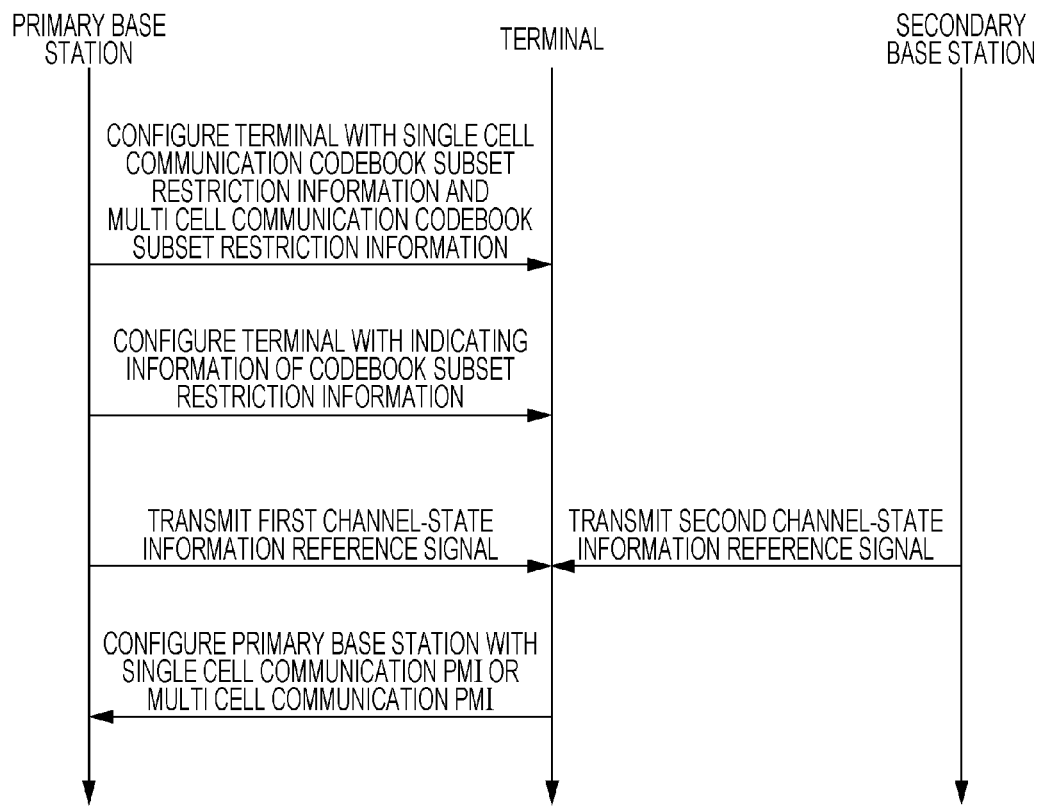

|  | SUBFRAME INDEX | | | | | | | | | |
|---|---|---|---|---|---|---|---|---|---|---|
|  | 0 | 1 | 2 | 3 | 4 | 5 | 6 | 7 | 8 | 9 |
| MEASURING SUBFRAME IDENTITY INFORMATION FOR SINGLE-CELL COMMUNICATION | 1 | 0 | 0 | 1 | 0 | 0 | 0 | 1 | 0 | 0 |
| MEASURING SUBFRAME IDENTITY INFORMATION FOR MULTI-CELL COMMUNICATION | 0 | 0 | 1 | 0 | 1 | 1 | 0 | 0 | 0 | 1 |

| PMO INDEX | POWER OFFSET VALUE |
|---|---|
| 0 | 3 dB |
| 1 | 0 dB |
| 2 | −3 dB |
| 3 | −∞ dB |

BASE-STATION APPARATUS, TERMINAL APPARATUS, COMMUNICATION SYSTEM, AND COMMUNICATION METHOD

TECHNICAL FIELD

The present invention relates to a base-station apparatus, a terminal apparatus, a communication system, and a communication method.

BACKGROUND ART

Radio communication systems perform high-speed data transmission using MIMO (Multi Input Multi Output). Such systems include WCDMA (Wideband Code Division Multiple Access), LTE (Long Term Evolution), and LTE-A (LTE Advanced), by 3GPP (Third Generation Partnership Project), and wireless LAN and WiMAX (Worldwide Interoperability for Microwave Access) by IEEE (The Institute of Electrical and Electronics engineers). The radio communication system includes a plurality of transmit and receive antennas in each of base stations (cells, transmit stations, transmitters, and eNodeB) and terminals (mobile terminals, receive stations, mobile stations, receivers, UE (User Equipment)).

The radio communication system measures channel state information between a base station and a terminal using channel-state information reference signal including known signals between the base station and the terminal (CSI-RS (Channel State Information-Reference signal), a pilot signal, and known signals)), and then adaptively controls modulation system and coding rate (MCS (Modulation and Coding Scheme)), spatial multiplexing numbers (number of layers, and rank), and precoding weight (a precoding matrix, and a precoder) in accordance with measurement results. The radio communication system thus performs data transmission more efficiently. For example, a method described in Non-patent Literature 1 may be used.

FIG. 20 schematically illustrates an example of adaptive control that is performed to transmit data in a downlink in a single-cell communication. As illustrated in FIG. 20, a base station 2001 transmits to a terminal 2002 (configures the terminal 2002 with) a channel state information-reference signal via a downlink (downlink line) 2003. A terminal 2002 measures channel state of the downlink 2003 in accordance with the received channel state information-reference signal of the base station 2001. The terminal 2002 transmits (feeds back) to the base station 2001 information for adaptive control (feedback information and report) via an uplink (uplink line) 2004.

The radio communication system may be arranged in a cellular structure in which a coverage area of the base station includes a plurality of cells, and a communication area is thus expanded. With frequencies different depending on adjacent cells (sectors), a terminal in a cell edge portion of the cell can communicate without interference, but a problem of frequency use efficiency still remains. For this reason, repeated use of the same frequency in each cell (sector) dramatically increases the frequency use efficiency, but a remedial step to interference on a terminal in the cell edge (cell end) area becomes necessary.

Under these circumstances, methods have been studied to reduce or suppress interference on the terminal at the cell edge area using an inter-cell cooperative communication as a multi-cell communication (cooperative communication). In the cell cooperative communication, adjacent cells cooperate with each other. For example, CoMP (Cooperative Multipoint) transmission scheme has been studied as described in Non Patent Literature 2.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 8), September 2010, 3GPP TS36.213 V9.3.0 (2010-9)

NPL 2: 3rd Generation Partnership Project; Technical Specification Group Radio Access Network; Further Advancements for E-UTRA Physical Layer Aspects (Release 9), March 2010, 3GPP TR36.814 V9.0.0 (2010-03)

SUMMARY OF INVENTION

Technical Problem

However, appropriate feedback information is different depending on whether a base station performs, to a terminal, single-cell transmission or multi-cell transmission. Related art communication method is appropriate for the single-cell communication. For this reason, if the terminal uses the appropriate feedback information for the single-cell communication during the multi-cell communication, efficient data transmission is difficult to perform. Even if both the base station and the terminal support the single-cell communication and the multi-cell communication, this problem serves as a factor that prevents transmission efficiency from being increased. The single-cell communication needs a more flexible precoding process, and the same problem serves as a factor that prevents the transmission efficiency from being increased.

The present invention has been developed in view of the above problem, and the object of the present invention is to provide, in a communication system in which a base station performs adaptive control on a terminal, the base station, the terminal, a communication system, and a communication method that efficiently support a precoding process.

Solution to Problem (1) The present invention has been developed to solve the above problem. According to an aspect of the present invention, a base-station apparatus in communication with a terminal apparatus, configures the terminal apparatus with information related to mapping between a first channel-state information reference signal and a second channel-state information reference signal and codebook subset restriction information that restricts selection of a codebook subset as feedback information by the terminal apparatus, the codebook subset indicating a precoding weight to perform a first communication and a second communication.

(2) According to another aspect of the present invention, the base-station apparatus configures the terminal apparatus with the codebook subset restriction information to perform the first communication and the codebook subset restriction information to perform the second communication.

(3) According to another aspect of the present invention, the base-station apparatus configures the terminal apparatus with the codebook subset restriction information commonly used to perform the first communication and the second communication.

(4) According to another aspect of the present invention, the base-station apparatus configures the terminal apparatus with indicating information that indicates feedback of information indicating a codebook to perform the first communication that the terminal apparatus selects using the codebook subset restriction information or information indicating a codebook to perform the second communication that the terminal apparatus selects using the codebook subset restriction information.

(5) According to another aspect of the present invention, the first communication is based on the first channel-state information reference signal and the second communication is based on the second channel-state information reference signal.

(6) According to another aspect of the present invention, a terminal apparatus in communication with a base-station apparatus uses information related to mapping between a first channel-state information reference signal and a second channel-state information reference signal and codebook subset restriction information that restricts selection of a codebook subset as feedback information by the terminal apparatus. The codebook subset indicates a precoding weight to perform a first communication and a second communication. Using the information related to the mapping and the codebook subset restriction information, derived from the base-station apparatus, the terminal apparatus selects a codebook to perform the first communication and a codebook to perform the second communication, and configures the base-station apparatus with information indicating the selected codebook to perform the first communication and information indicating the selected codebook to perform the second communication.

(7) According to another aspect of the present invention, in the terminal apparatus, the first communication is based on the first channel-state information reference signal and the second communication is based on the second channel-state information reference signal.

(8) According to another aspect of the present invention, a base-station apparatus in communication with a terminal apparatus configures the terminal apparatus with codebook subset power offset information in accordance with which power offset control responsive to a channel state is performed on a codebook subset indicating a precoding weight for communication in computation of feedback information by the terminal apparatus.

(9) According to another aspect of the present invention, a terminal apparatus in communication with a base-station apparatus uses codebook subset power offset information in accordance with which power offset control responsive to a channel state is performed on a codebook subset indicating a precoding weight for communication in computation of feedback information by the terminal apparatus, the codebook subset power offset information derived from the base-station apparatus. Using the codebook subset power offset information derived from the base-station apparatus, the terminal apparatus selects a codebook for the communication and configures the base-station apparatus with information indicating the selected codebook.

(10) According to another aspect of the present invention, a communication system includes a base-station apparatus and a terminal apparatus in communication with each other. The base-station apparatus configures the terminal apparatus with information related to mapping between a first channel-state information reference signal and a second channel-state information reference signal and codebook subset restriction information that restricts selection of a codebook subset as feedback information by the terminal apparatus. The codebook subset indicates a precoding weight to perform a first communication and a second communication. Using the information related to the mapping between the first channel-state information reference signal and the second channel-state information reference signal, and the codebook subset restriction information, the terminal apparatus selects a codebook to perform the first communication and a codebook to perform the second communication, and configures the base-station apparatus with information indicating the selected codebook to perform the first communication and information indicating the selected codebook to perform the second communication.

(11) According to another aspect of the present invention, a communication system includes a base-station apparatus and a terminal apparatus in communication with each other. The base-station apparatus configures the terminal apparatus with codebook subset power offset information in accordance with which power offset control responsive to a channel state is performed on a codebook subset indicating a precoding weight for communication in computation of feedback information by the terminal apparatus. Using the codebook subset power offset information, the terminal apparatus selects a codebook to perform the communication, and configures the base-station apparatus with information indicating the selected codebook.

(12) According to another aspect of the present invention, a communication method of a base-station apparatus in communication with a terminal apparatus, includes a step of configuring the terminal apparatus with information related to mapping between a first channel-state information reference signal and a second channel-state information reference signal and codebook subset restriction information that restricts selection of a codebook subset as feedback information by the terminal apparatus, the codebook subset indicating a precoding weight to perform a first communication and a second communication.

(13) According to another aspect of the present invention, a communication method of a terminal apparatus in communication with a base-station apparatus, includes a step of selecting a codebook to perform a first communication and a codebook to perform a second communication, using information related to mapping between a first channel-state information reference signal and a second channel-state information reference signal and codebook subset restriction information that restricts selection of a codebook subset as feedback information by the terminal apparatus, the codebook subset indicating a precoding weight to perform the first communication and the second communication, the information related to the mapping and the codebook subset restriction information derived from the base-station apparatus, and a step of configuring the base-station apparatus with information indicating the selected codebook to perform the first communication and information indicating the selected codebook to perform the second communication.

(14) According to another aspect of the present invention, a communication method of a base-station apparatus in communication with a terminal apparatus includes a step of configuring the terminal apparatus with codebook subset power offset information in accordance with which power offset control responsive to a channel state is performed on a codebook subset indicating a precoding weight for communication in computation of feedback information by the terminal apparatus.

(15) According to another aspect of the present invention, a communication method of a terminal apparatus in communication with a base-station apparatus, includes a step of selecting a codebook for a communication, using codebook subset power offset information in accordance with which power offset control responsive to a channel state is performed on a codebook subset indicating a precoding weight for the communication in computation of feedback information by the terminal apparatus, the codebook subset power offset information derived from the base-station apparatus, and a step of configuring the base-station apparatus with information indicating the selected codebook.

Advantageous Effects of Invention

According to the present invention, the base station efficiently supports a precoding process to the terminal.

BRIEF DESCRIPTION OF DRAWINGS

FIG. 13 is a schematic block diagram illustrating a configuration of a feedback information generator 404 of a second embodiment of the present invention.

FIG. 14 illustrates an example of a configuration procedure of control information of the second embodiment of the present invention.

DESCRIPTION OF EMBODIMENTS

First Embodiment

A first embodiment of the present invention is described below. A communication system of the first embodiment includes, as a base station (a transmitter, a cell, a transmit point, a transmit antenna group, a transmit antenna port group, a component carrier, and eNodeB), a primary station (a first base station, a first communication apparatus, a serving base station, an anchor base station, and a first component carrier) and a secondary base station (a second base station apparatus, a cooperative base station group, a cooperative base station set, a second communication apparatus, a cooperative base station, and a second component carrier), a terminal (a terminal apparatus, a mobile terminal, a receive point, a receive terminal, a receiver apparatus, a third communication apparatus, a receive antenna group, a receive antenna port group, and UE). Optionally, a plurality of secondary base stations may be employed.

Figure 1:
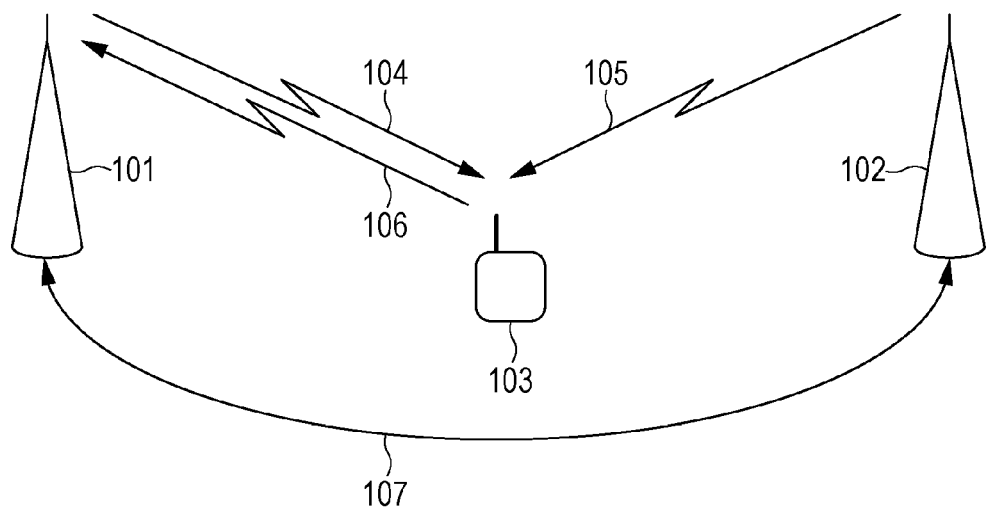
FIG. 1 schematically illustrates an example of adaptive control that is performed to transmit data in a downlink in a multi-cell communication of a first embodiment of the present invention.

FIG. 1 schematically illustrates an example of adaptive control that is performed to transmit data in a downlink in a multi-cell communication of the first embodiment of the present invention. As illustrated in FIG. 1, a terminal 103 is located in cell edge regions (border regions) of a primary base station 101 and a secondary base station 102, and performs a multi-cell communication with each of the primary base station 101 and the secondary base station 102. The terminal 103 receives a channel-state information reference signal of the primary base station 101 that is transmitted via a downlink 104 between the primary base station 101 and the terminal 103. The terminal 103 also receives a channel-state information reference signal of the secondary base station 102 that is transmitted via a downlink 105 between the secondary base station 102 and the terminal 103. The terminal 103 estimates the channel state of each of the downlink 104 and the downlink 105 using the channel-state information reference signals of the primary base station 101 and the secondary base station 102. The terminal 103 generates information for adaptive control (feedback information) in accordance with the estimated channel states. Using an uplink 1606, the terminal 103 transmits the feedback information to the primary base station 101. In accordance with the feedback information, the primary base station 101 performs the adaptive control and scheduling on a data signal to the terminal 103, and transmits control information to perform a multi-cell communication with the secondary base station 102, via line (X2 interface) 107 that is based on optical fiber and relay techniques. The primary base station 101 and the secondary base station 102 cooperatively transmit data signals addressed to the terminal 103 using the downlink 104 and the downlink 105, respectively.

When data signals are transmitted via the multi-cell communications of the primary base station 101 and the terminal 103, the terminal 103 can perform a reception process without being aware that the secondary base station 102 performs a cooperative communication. In other words, even in the multi-cell communication with the terminal 103, the primary base station 101 can use the control signal that is used in the single-cell communication. More specifically, if the primary base station 101 and the secondary base station 102 transmit the same data signal to the terminal 103, the terminal 103 can thus perform a reception process to receive the control information derived from the primary base station without performing any particular process by performing a process, identical to a process in the single-cell communication.

Figure 2:
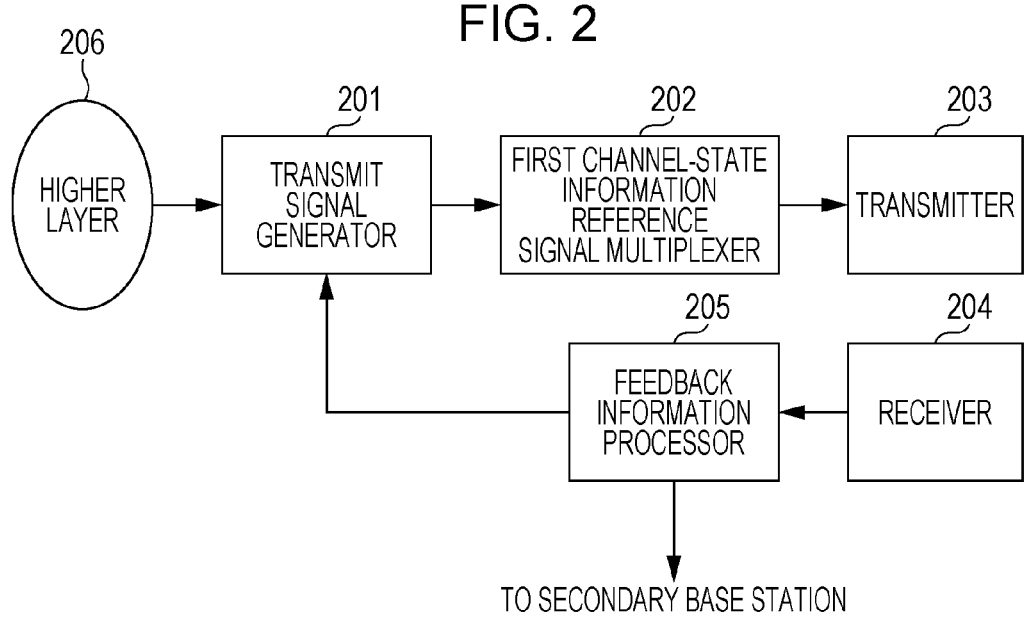
FIG. 2 is a schematic block diagram illustrating a configuration of a primary base station 101 of the first embodiment of the present invention.

FIG. 2 is a schematic block diagram illustrating a configuration of the primary base station 101 of the first embodiment of the present invention. The primary base station 101 herein may be a base station that receives the feedback information from the terminal 103 or a base station that transmits to the terminal 103 the control information (such as information transmitted via PDCCH (Physical Downlink Control Channel)). The primary base station 101 is one of the base stations that perform the cooperative communication with the terminal 103. As illustrated in FIG. 2, the primary base station 101 includes a transmit signal generator 201, a first channel-state information reference signal multiplexer 202, a transmitter 203, a receiver 204, a feedback information processor 205, and a higher layer 206.

The receiver 204 receives from the terminal 103 a data signal, containing the feedback information transmitted from the terminal 103, via an uplink (such as PUCCH (Physical Uplink Control Channel), PUSCH (Physical Uplink Shared Channel)) 106.

The receiver 204 performs on the signal received via a receive antenna a reception process corresponding to a transmission process that the terminal 103 has performed for signal transmission. The reception process includes an OFDM demodulation process, a demodulation process, and a decoding process. The receiver 204 then identifies the feedback information from the received signals, and then outputs the feedback information to the feedback information processor 205.

If a plurality of terminals 103 in communication with the primary base station 101 are present, the primary base station 101 may multiplex data signals for the terminals 103 to the uplink 106 using a variety of multiple accesses including SC-FDMA (Single carrier-frequency division multiple access), Clustered DFT-S-OFDM (Discrete Fourier Transform-Spread-OFDM), OFDMA, time division multiple access, and code division multiple access. The primary base station 101 may use a variety of methods as a method to identify the feedback information of each terminal 103. For example, the primary base station 101 specifies a resource (elements to perform signal transmission divided by time, frequency, code, spatial area, and other factor) through which each terminal 103 transmits the feedback information, and the terminal 103 then transmits the feedback information using the specified resource. The primary base station 101 can thus identify the feedback information. The primary base station 101 can also identify each piece of feedback information by attaching identity information unique to each terminal 103 to the feedback information.

In accordance with the input feedback information, the feedback information processor 205 generates adaptive control information that is used to perform the adaptive control on the data signal to be transmitted to the terminal 103. If the feedback information of the primary base station 101 is included, the feedback information processor 205 generates the adaptive control information of the primary base station 101 and then outputs the adaptive control information to the transmit signal generator 201.

In response to the adaptive control information, the transmit signal generator 201 may adaptively control an encoding process, a modulation process, a layer mapping process, a precoding process, a resource element mapping process, and other process in the primary base station 101. The adaptive control information can be output to the higher layer.

If the feedback information of the secondary base station 102 is included, the feedback information processor 205 generates adaptive control information for an encoding process, a modulation process, a layer mapping process, a precoding process, a resource element mapping process, and other process to be performed by the secondary base station 102 to be discussed below, and then outputs the adaptive control information to the secondary base station 102 via a line such as the X2 interface (preferably a wired line of an optical fiber or a dedicated wireless line based on relay technique). A line connecting the base stations finds a variety of applications in addition to the communication of the adaptive control information from the primary base station 101 to the secondary base station 102. For example, base-station information and control information may be communicated to perform the cooperative communication from the secondary base station 102 to the primary base station 101. If no feedback information of each base station is included, the control to the process may be performed in a predetermined fashion.

A method of the adaptive control based on the feedback information is described below. The feedback information may be used in a variety of methods. The following discussion focuses on a method that employs recommended transmit format information (implicit channel state information) and information indicating a channel state (channel condition and transmission channel) (explicit channel state information) with respect to the base station.

If the feedback information is the recommended transmit format information with respect to the base station, it is assumed that both the base station and the terminal store an index to a known transmit format. The terminal feeds back information in the transmit format, and the base station performs the adaptive control using the information. More specifically, CQI (Channel Quality Indicator) is information indicating a coding rate and a modulation scheme, and can thus control the encoding process and the modulation process. PMI (Precoding Matrix Index) is information indicating a precoding matrix, and can thus control the precoding process. RI (Rank Indicator) is information indicating the number of layers, and can thus control the layer mapping process and a higher layer that generates a codeword. If the feedback information related to mapping to a resource is also included, the information can control a resource element mapping process. PMI may be categorized into a plurality of types depending on the method, purpose, and application of the data transmission, and is described in great detail below.

If the feedback information is information indicating the channel state, the terminal feeds back information indicating the channel state to the base station using the channel-state information reference signal from the base station. In such a case, the information indicating the channel state may be reduced in an amount of information using a variety of methods including eigenvalue decomposition or quantization. The base station controls the terminal using the fed back information indicating the channel state. For example, in accordance with the information fed back, the base station determines the coding rate, the modulation scheme, the number of layers, and the precoding matrix so that the terminal performs optimum reception. A variety of methods in this operation may be used.

The higher layer 206 generates a data signal for the terminal 103, and then outputs the data signal to the transmit signal generator 201.

The transmit signal generator 201 performs the adaptive control responsive to the adaptive control information output from the feedback information processor 205 on the data signal output from the higher layer 206. The transmit signal generator 201 thus generates a transmit signal for the terminal 103. More specifically, the transmit signal generator 201 performs an encoding process to perform an error correction encoding, a scrambling process to perform unique scramble coding on the terminal 103, a modulation process to use multi-level modulation, a layer mapping process to perform spatial multiplexing such as MIMO, and a precoding process to perform phase rotation operation, beam forming operation and other operation.

In the precoding process, the phase rotation operation is preferably performed on a generated signal so that the terminal 103 receives the signal with a higher efficiency (for example, so that received power is maximized, or so that interference from an adjacent cell is reduced, or so that interference to an adjacent cell is reduced). The transmit signal generator 201 may perform the process of a predetermined precoding matrix using CCD (Cyclic Delay Diversity), or a transmission diversity (such as SFBC (Spatial Frequency Block Code), STBC (Spatial Time Block Code), TSTD (Time Switched Transmission Diversity), FSTD (Frequency Switched Transmission Diversity)). But diversities usable are not limited to these. If a plurality of types into which PMI is categorized are fed back, an operation of multiplying the plurality of PMIs may be performed to perform the precoding process.

Before performing the precoding process, the transmit signal generator 201 multiplexes, to the transmit signal, data signal demodulation reference signals (DM-RS (Demodulation Reference Signal), DRS (Dedicated Reference Signal), Precoded RS, User Unique Reference Signal, UE-specific RS) for the terminal 103 to demodulate the transmit signal. The precoding process is performed on the data signal demodulation reference signals together with the transmit signal to the terminal 103. The data signal demodulation reference signals of the layers are orthogonalized using Code Division Multiplexing through orthogonal code (CDM), such as Walsh code, or Frequency Division Multiplexing (FDM), or in combination with CDM and FDM.

In order to measure a channel state of the downlink 104 between the primary base station 101 and the terminal 103 (a first channel state), the first channel-state information reference signal multiplexer 202 generates the first channel-state information reference signal (a cell unique reference signal, CRS (Common RS), Cell-specific RS, Non-precoded RS) known to the primary base station 101 and the terminal 103, and multiplexes the first channel-state information reference signal to the input transmit signal. Any signal (sequence) may be used for the first channel-state information reference signal as long as the signal is known to the primary base station 101 and the terminal 103. For example, a random number or a pseudo-noise sequence based on a pre-assigned parameter such as a number unique to the primary base station 101 (cell ID) may be used for the first channel-state information reference signal. Orthogonalization methods between antenna ports may include a method that nullifies between the antenna ports the resource elements (to zero) that the first channel-state information reference signal is mapped to, a method of code division multiplexing through the pseudo-noise sequence, and a method of combining these methods. The channel-state information reference signal may not necessarily be multiplexed to all the subframes. The channel-state information reference signal may be simply multiplexed to some of the subframes.

The transmitter 203 performs a mapping process to map the transmit signal output from the first channel-state information reference signal multiplexer 202 to the resource element of each antenna port, and performs a transmission process to transmit the transmit signal via a transmit antenna.

Figure 3:
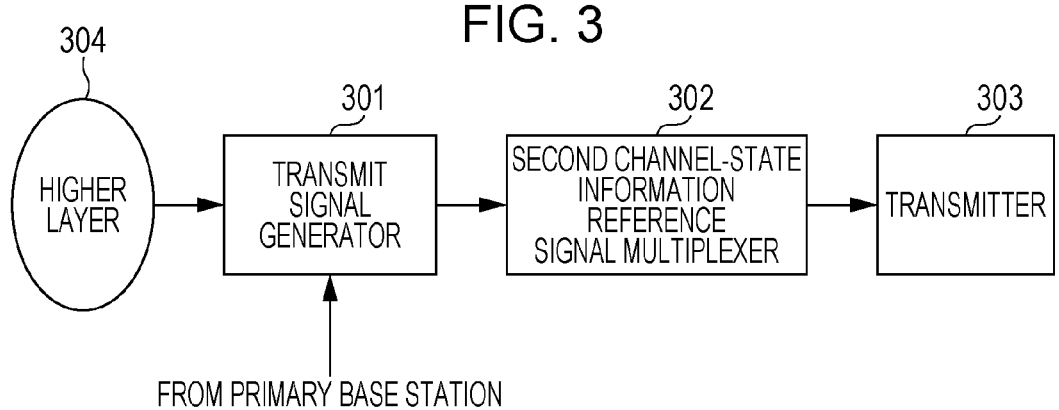
FIG. 3 is a schematic block diagram illustrating a configuration of a secondary base station 102 of the first embodiment of the present invention.

FIG. 3 is a schematic block diagram illustrating a configuration of the secondary base station 102 of the first embodiment of the present invention. From among the base stations that perform the cooperative communication to the terminal 103, the secondary base station 102 is the base station other than the primary base station 101 described with reference to FIG. 1. As illustrated in FIG. 3, the secondary base station 102 includes a transmit signal generator 301, a second channel-state information reference signal multiplexer 302, a transmitter 303, and a higher layer 304.

In response to the adaptive control information for the terminal 103 output from the primary base station, the transmit signal generator 301 adaptively controls an encoding process, a modulation process, a layer mapping process, a precoding process, and a resource element mapping process. The adaptive control information is received from the primary base station 101 via a line such as the X2 interface. In a cooperative communication to transmit an information data signal from the secondary base station 102 to the terminal 103 (such as Joint Transmission, or Dynamic Cell Selection), an information data signal from the primary base station 101 to the terminal 103 is also received via a line such as the X2 interface.

The following discussion focuses on part of the operation of the secondary base station 102 different from that of the primary base station 101 discussed with reference to FIG. 2.

The precoding process in the transmit signal generator 301 can be changed in operation depending on a cooperative communication scheme to the terminal 103. In a cooperative communication scheme such as joint transmission (Joint Transmission), joint processing (Joint Processing), or dynamic cell selection (Dynamic Cell Selection), in which the secondary base station 102 also transmits the information data signal for the terminal 103, the precoding process is preferably performed so that the terminal 103 optimally receives the information data signal in cooperation with the primary base station 101. In a cooperative communication scheme, such as coordinated scheduling (Coordinated Scheduling) or coordinated beam forming (Coordinated Beamforming), the precoding process (including transmit power control) is preferably performed on the information data signal of another mobile terminal so that interference from the secondary base station 102 to the terminal 103 is reduced.

In order to measure the channel state of the downlink 105 between the secondary base station 102 and the terminal 103 (a second channel state), the second channel-state information reference signal multiplexer 302 generates the second channel-state information reference signal known to the secondary base station 102 and the terminal 103, and then multiplexes the second channel-state information reference signal to the transmit signal generated by the transmit signal generator 301. Any signal (sequence) may be used for the second channel-state information reference signal as long as the signal is known to the secondary base station 102 and the terminal 103. For example, a random number or a pseudo-noise sequence based on a pre-assigned parameter such as a number unique to the secondary base station 102 (cell ID) may be used for the second channel-state information reference signal. Orthogonalization methods between antenna ports may include a method that nullifies between the antenna ports the resource elements (to zero) that the second channel-state information reference signal is mapped to, and a method of code division multiplexing through the pseudo-noise sequence.

Figure 4:
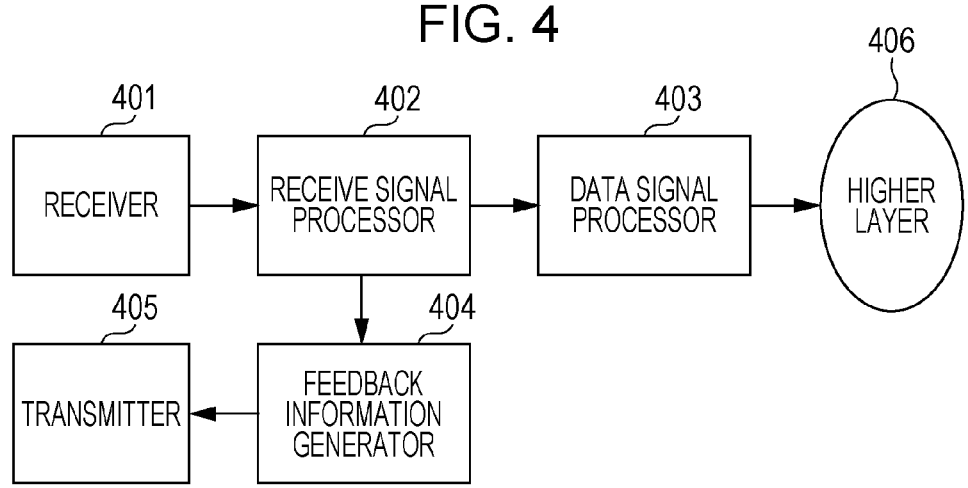
FIG. 4 is a schematic block diagram illustrating a configuration of a terminal 103 of the first embodiment of the present invention.

FIG. 4 is a schematic block diagram illustrating a configuration of the terminal 103 of the first embodiment of the present invention. As illustrated in FIG. 4, the terminal 103 includes a receiver 401, a receive signal processor 402, a data signal processor 403, a feedback information generator 404, a transmitter 405, and a higher layer 406.

The receiver 401 receives signals, transmitted by the primary base station 101 and the secondary base station 102, via receive antenna of at least one antenna (the number of receive antenna ports), and performs a conversion process to convert a radio frequency to a baseband signal. The receive signal processor 402 removes an attached guard interval, performs a time-frequency conversion process through Fast Fourier Transform (FFT) to transform the baseband signal into a signal in a frequency domain. The receive signal processor 402 demaps (separates) signals mapped by the primary base station 101 and the secondary base station 102. If a data signal addressed to the terminal 103 is included in the demapped signal, the receive signal processor 402 outputs the data signal to the data signal processor 403. If the first channel-state information reference signal and the second channel-state information reference signal are included in the demapped signal, the receive signal processor 402 outputs these channel-state information reference signals to the feedback information generator 404. A control information signal is shared by the entire terminal 103 (including the higher layer), and is used to perform a variety of control operations (not illustrated) in the terminal 103, such as demodulation of the data signal.

The data signal processor 403 performs, on the input data signal, a channel estimating process, a channel compensation process (filtering process), a layer de-mapping process, a demodulation process, a descrambling process, and a decoding process, and then outputs a resulting signal to the higher layer 406. In the channel estimating process, the data signal processor 403 determines a channel estimation value by estimating (channel-estimating) variations in amplitude and phase of each resource element (frequency response, and transfer function) with respect to each layer (rank and spatial multiplexing) in accordance with a data signal demodulation reference signal multiplexed on the input data signal. The data signal processor 403 performs channel-estimation by interpolating in frequency direction and time direction a resource element, if the data signal demodulation reference signal is not mapped thereto, in accordance with a resource element with the data signal demodulation reference signal mapped to. In the channel compensation process, the data signal processor 403 performs channel compensation on the input data signal using the estimated channel estimation value, thereby detecting (restoring) a data signal of each layer. The detection method includes using ZF (Zero Forcing) equalization, MMSE (Minimum Mean Square Error) equalization, or interference removal. In the layer demapping process, a signal on each layer is demapped to respective codeword. All the processes hereinafter are performed on a per codeword basis. The data signal processor 403 performs the demodulation process based on a modulation scheme in use. The data signal processor 403 performs the descrambling process based on a scramble code in use. In the decoding process, the data signal processor 403 performs an error correction decoding process in accordance with the encoding scheme performed.

The feedback information generator 404 generates the feedback information in accordance with the input channel-state information reference signal.

Figure 5:
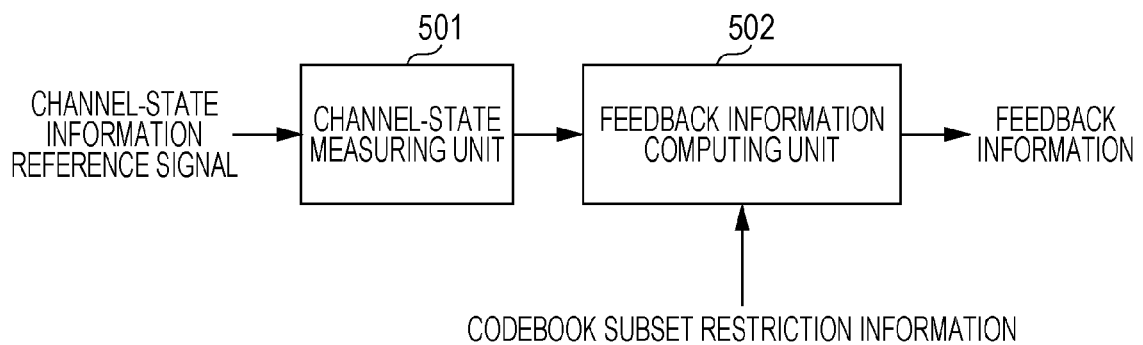
FIG. 5 is a schematic block diagram illustrating a configuration of a feedback information generator 404 of the first embodiment of the present invention.

FIG. 5 is a schematic block diagram illustrating a configuration of the feedback information generator 404 of the first embodiment of the present invention. As illustrated in FIG. 5, the feedback information generator 404 includes a channel-state measuring unit 501 and a feedback information computing unit 502.

Using the received channel-state information reference signal, the channel-state measuring unit 501 measures on each base station the channel state of a transmit antenna of each base station with respect to a receive antenna of the terminal 103, and thus generates a channel-state measurement value on each base station. Next, the feedback information computing unit 502 calculates the feedback information in accordance with the generated channel-state estimation value. The feedback information computing unit 502 receives codebook subset restriction information contained in the control information signal or the like, and accounts for the codebook subset restriction information in the computation of the feedback information. This operation is described in greater detail below.

The feedback information may be generated on a unit in the frequency direction (for example, on every subcarrier, on every resource element, on every resource block, or on every subband with each subband including a plurality of resource blocks), in the time direction (for example, on every OFDM symbol, on every subframe, on every slot, or on every radio frame), or in the spatial direction (on every antenna port, on every transmit antenna, or on every receive antenna). The feedback information may also be generated in a combination of these units.

If the recommended transmit format information is generated on base station as the feedback information, a variety of generation methods may be used. For example, a maximum number of layers that can be spatial-multiplexed is determined using eigenvalue decomposition in accordance with the generated the channel state estimation value in order to generate RI. The precoding matrix permitting optimum reception is estimated in accordance with the generated RI and the channel state estimation value in order to generate PMI. To generate the PMI, the channel state estimation value may be multiplied by the precoding matrix serving as a candidate, and a precoding matrix that becomes optimal in the cooperative communication may be selected from among the precoding matrices as candidates. Also, using eigenvalue decomposition, an optimal precoding matrix may be selected from among the precoding matrices as candidates. The precoding matrix that serves as a candidate is determined in accordance with the input codebook subset restriction information. The modulation scheme and the coding rate on the information data signal are selected in accordance with the generated RI, PMI, and channel state estimation value in order to generate CQI. In order to generate CQI, Signal to Interference plus Noise Power Ratio (SINR), Signal to Interference power Ratio (SIR), Signal to Noise power Ratio (SNR), path loss, and the like are measured, a lookup table of CQI that satisfies required quality is preset with respect to each of the measurement values, SINR is determined in the cooperative communication, and then CQI is determined from the lookup table.

The generated feedback information is input to the transmitter 405. In order to transmit (feed back) to the primary base station 101 the feedback information output from the feedback information generator 404, the transmitter 405 performs an encoding process, a modulation process, an OFDM signal generation process, a guard interval insertion process, a frequency conversion process, and other process, and thus generates an uplink transmit signal. The transmitter 405 further transmits to the primary base station 101 the generated uplink transmit signal via an uplink (PUCCH or PUSCH). It is noted that the uplink transmit signal may be transmitted not only to the primary base station 101 but also to the secondary base station 102.

In a method of feeding back to the primary base station 101 the uplink transmit signal including the thus generated feedback signal, the uplink transmit signal may be divided into a plurality of subframes via PUCCH specified by the primary base station 101 and then transmitted to the primary base station 101. Whole or part of the generated feedback information may be transmitted in one subframe via PUSCH specified by the primary base station 101. In such a case, the feedback information may be transmitted together with the information data signal from the terminal 103.

Figure 6:
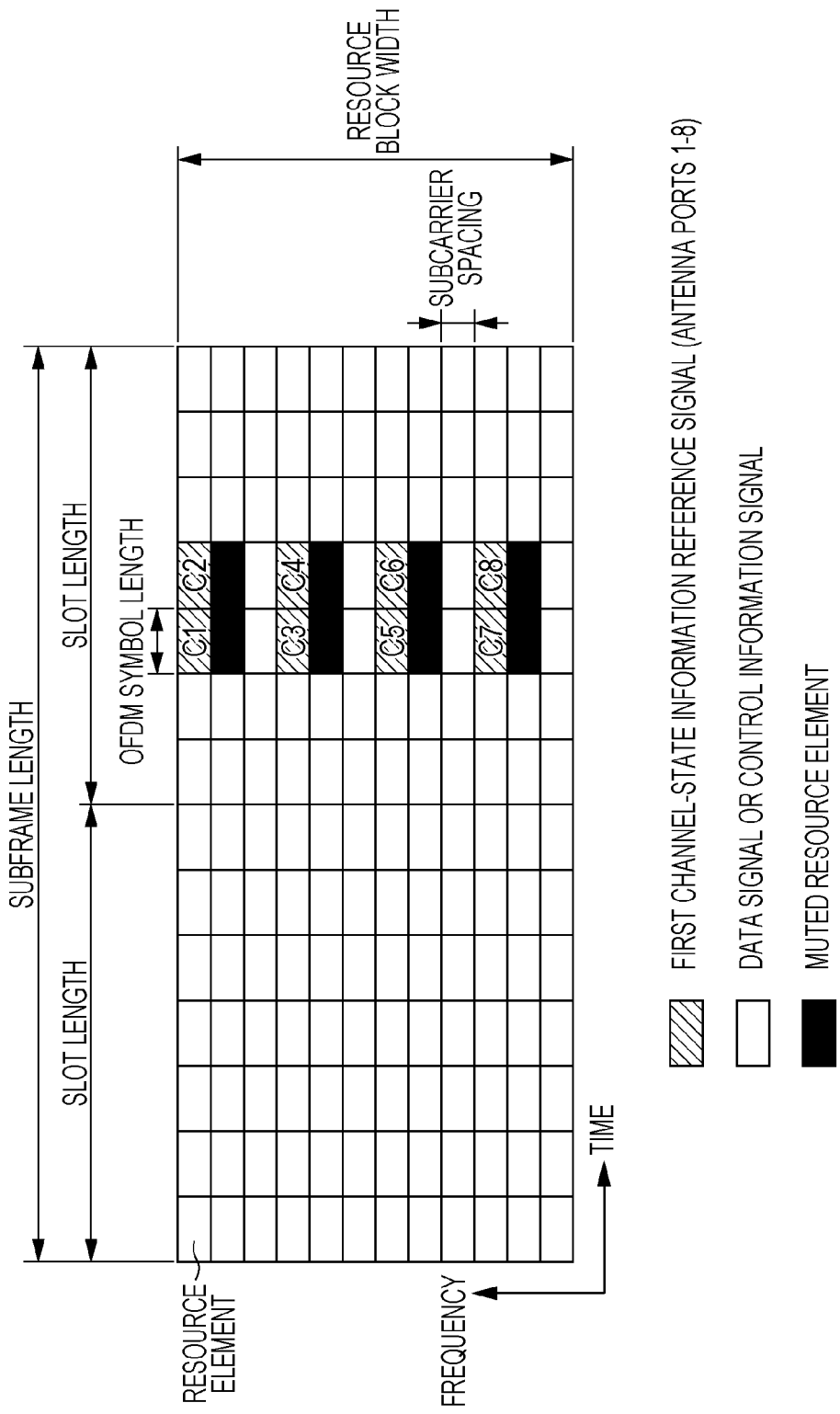
FIG. 6 illustrates a first channel-state information reference signal, a data signal or a control information signal, and an example of a muted resource element, mapped by the primary base station 101.

FIG. 6 illustrates a first channel-state information reference signal, a data signal or a control information signal, and an example of a muted resource element, mapped by the primary base station 101. FIG. 6 illustrates the case in which each signal is mapped with the number of antenna ports of the primary base station 101 being 8. FIG. 6 also illustrates two resource blocks within one subframe. One resource block includes 12 subcarriers in the frequency direction and 7 OFDM symbols in the time direction. Each subcarrier in one OFDM symbol is referred to as a resource element. Of each subframe, preceding and subsequent 7 OFDM symbols in the time direction are also respectively referred to as a slot.

Hatched resource elements C1 through C8 respectively represent the first channel-state information reference signals at antenna ports 1 through 8. Blackened resource elements represent muted resource elements and indicate that the resource elements are null (zero). In this example, the muted resource elements correspond to resource elements to which the second channel-state information reference signals of the secondary base station 102 of FIG. 7 to be discussed below are mapped. A data signal or a control information signal is mapped to a white resource element. The number of layers (rank) of the data signal or the control information signal may be set to a maximum of 8. For example, the number of layers of the data signal may be set to 2, and the number of layers of the control information signal may be set to 1.

The number of resource blocks may be changed depending on a frequency bandwidth (system bandwidth) used by the communication system. For example, 6 through 110 resource blocks may be used. Frequency aggregation may increase resource blocks to 110 or more in the entire system bandwidth. A component carrier typically includes 100 physical resource blocks, and a guard band is inserted between the component carriers. Five component carriers may thus include 500 physical resource blocks in the entire system bandwidth. This may be expressed in bandwidth. For example, the component carrier is 20 MHz, and the guard band is inserted between the component carriers. Five component carriers has thus an entire system bandwidth of 100 MHz.

Figure 7:
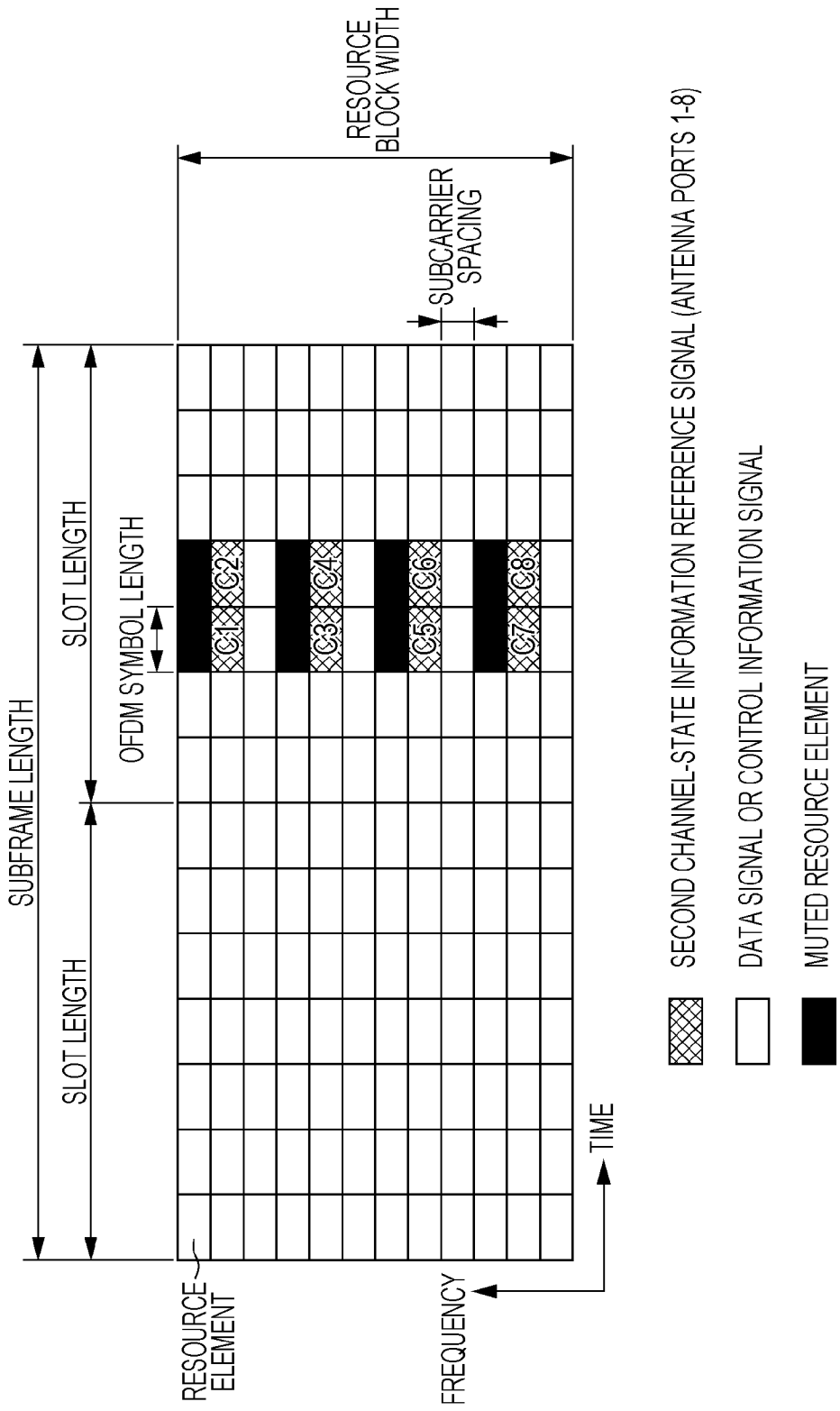
FIG. 7 illustrates a second channel-state information reference signal, a data signal or a control information signal, and an example of a muted resource element, mapped by the secondary base station 102.

FIG. 7 illustrates the second channel-state information reference signal, a data signal or a control information signal, and an example of a muted resource element mapped by the secondary base station 102. The second channel-state information reference signal is mapped so that the first channel-state information reference signal discussed with reference to FIG. 6 is frequency-division multiplexed in FDM process.

The resource elements in the example of FIG. 7 are shifted by subcarrier in the frequency direction as compared to the example of FIG. 6. The muted resource elements correspond to resource elements to which the first channel-state information reference signal of the primary base station 101 of FIG. 6 is mapped.

The terminal 103 may be configured with or reported of, as control information (including RRC (Radio Resource Control) signal), a location and a signal sequence to which each channel-state information reference signal is mapped, or the terminal 103 may identify the location and the signal sequence in accordance with other control information such as a cell ID. Alternatively, the terminal 103 may be configured with or reported of a location and a signal sequence to which the channel-state information reference signal of one antenna port only from among a plurality of antenna ports is mapped, and the terminal 103 then may identify another antenna port in accordance with the location and the signal sequence.

In the examples of FIG. 6 and FIG. 7, the primary base station 101 and the secondary base station 102 respectively mute resource elements to which the each other's channel-state information reference signals of the data signal or the control information signal to be mapped are mapped. More specifically, the primary base station 101 mutes the resource element to which the second channel-state information reference signal to be mapped by the secondary base station 102, of the information data signal or the control information signal to be mapped, is mapped. Also, the secondary base station 102 mutes the resource element to which the first channel-state information reference signal to be mapped by the primary base station 101, of the information data signal or the control information signal to be mapped, is mapped. The resource element to be mapped may be mapped entirely or partially. The muting of the resource element causes the terminal 103 to estimate the channel state efficiently in the cooperative communication. As a muting method, subsequent to the mapping of the data signal or the control information signal, a signal of the resource element to which the channel-state information reference signal of another cooperative base station is mapped may be decimated (puncturing). Also, the data signal or the control information signal may be mapped so that the resource element to which the channel-state information reference signal of another cooperative base station is mapped is avoided (rate matching).

The codebook subset restriction information and the feedback information of PMI, used in the first embodiment, are described below. In the following discussion, a codebook means a precoding weight that is organized as a codebook known to the primary base station 101, the secondary base station 102, and the terminal 103. A codebook subset is a small set of such codebooks.

Figures 8, 9, 10:
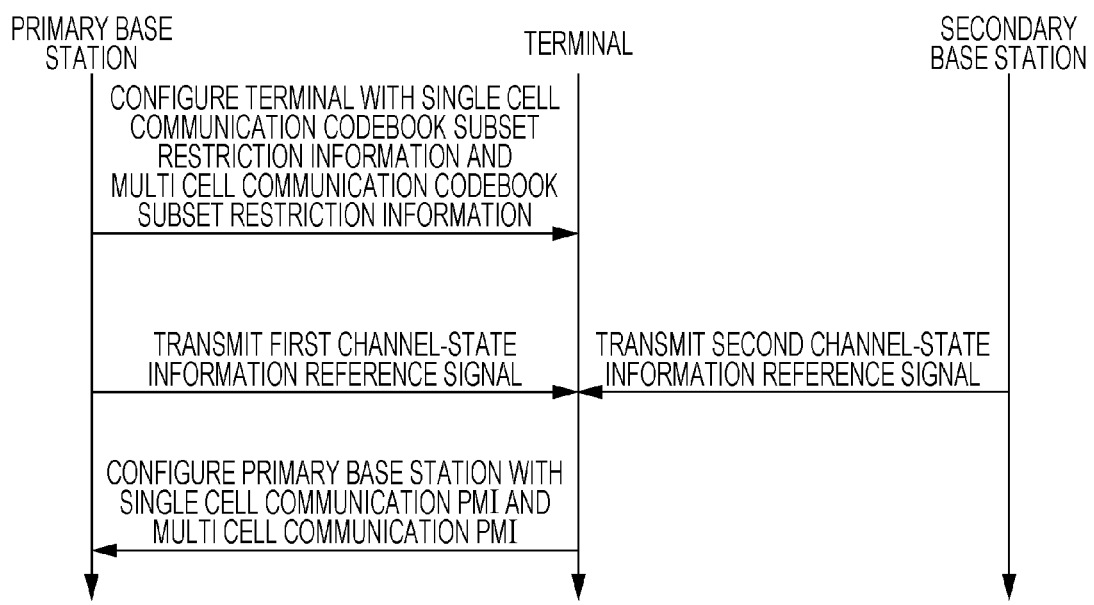
FIG. 8 illustrates an example of a codebook subset with the number of antenna ports being 2.
FIG. 9 illustrates an example of the number of codebooks corresponding to the number of antenna ports.
FIG. 10 illustrates an example of a configuration procedure of control information of the first embodiment of the present invention.

FIG. 8 illustrates an example of a codebook subset with the number of antenna ports being 2. FIG. 8 illustrates four codebooks (W10, W11, W12, and W13) with rank being 1, and two codebooks (W21, and W22) with rank being 2. In other words, the number of codebooks is 6 if the number of antenna ports is 2.

The terminal 103 selects an appropriate codebook from the codebook subset using the channel-state information reference signal of each base station, and then feeds back to the primary base station 101 the selected codebook as PMI. In this case, each base station can cause the terminal 103 to restrict part or whole of the selectable codebook subset as PMI. To implement such restriction, the primary base station 101 configures the terminal with the codebook subset restriction information as control information to the terminal 103.

The codebook subset restriction information is the control information that is in a bitmap format responsive to each codebook. More specifically, 1-bit control information is set up in each codebook and if the selection of each codebook as PMI is restricted by setting the control information to "0", and if the selection of each codebook is not restricted, the control information is set to "1". In the example of FIG. 8, the codebook subset restriction information with the number of antenna ports being 2 is G-bit information in a bitmap format. For example, if the rank of 2 is restricted, the codebook subset restriction information of the codebooks corresponding to W21 and W22 may be respectively set to "0".

FIG. 9 illustrates an example of the number of codebooks corresponding to the number of antenna ports. FIG. 9 illustrates the number of codebooks on each rank with the number of antennas being 4 and 8 in addition to the number of antenna ports being 2 illustrated in FIG. 8. If the number of antenna ports is 4, the number of codebooks of 16 is available on each rank ranging to rank of 4. The codebook subset restriction information is then 64-bit information in the bitmap format. If the number of antenna ports is 8, two partial precoding weights can be used to specify the precoding weight. Let W1 and W2 respectively represent the partial precoding weights, and the precoding weight may be expressed by performing an operation (such as four arithmetic operations or weighting multiplication) on the partial precoding weights W1 and W2. A codebook is set up for each of the partial precoding weights W1 and W2. In the example of FIG. 9, the number of codebooks for W1 and W2 are set up depending on rank. The codebook subset restriction information is then 109-bit information in the bitmap format.

The codebook subset is predetermined information known to each base station and the terminal 103, and is dependent on the number of antenna ports of the base station. More specifically, in response to the control information with which each base station configures the terminal 103, the terminal 103 can identify the number of antenna ports of the base station, and recognize the codebook subset used by that base station.

The codebook subset restriction information is control information which is unique to the terminal 103, and is information with which the primary base station 101 configures the terminal 103. The configuration method may be included in the control information addressed to the terminal 103 (such as PDCCH or RRC signaling).

In one example of the first embodiment of the present invention, the primary base station 101 may configure the terminal 103 with the codebook subset restriction information for a multi-cell communication (second communication) in addition to the codebook subset restriction information for a single-cell communication (first communication). In this example, a codebook subset common to the single-cell communication and the multi-cell communication is used.

FIG. 10 illustrates an example of a configuration procedure of control information of the first embodiment of the present invention. The primary base station 101 configures the terminal 103 with the codebook subset restriction information for the single-cell communication and the codebook subset restriction information for the multi-cell communication. In response to these pieces of control information, the terminal 103 sets, from among predetermined codebook subsets common to the single-cell communication/the multi-cell communication, a selectable codebook subset as PMI for the single-cell communication, and a selectable codebook subset as PMI selectable for the multi-cell communication. The primary base station 101 transmits the first channel-state information reference signal to the terminal 103 while the secondary base station 102 transmits the second channel-state information reference signal to the terminal 103. Using these channel-state information reference signals, the terminal 103 measures each channel state, and then selects appropriate PMI for the single-cell communication and appropriate PMI for the multi-cell communication, from among the selectable codebook subsets as the set PMIs. The terminal 103 configures the primary base station 101 with the selected appropriate PMI for the single-cell communication and the selected appropriate PMI for the multi-cell communication. In response to each of the configured PMIs, the primary base station 101 schedules data transmission to the terminal 103.

Using the above-described method, the primary base station 101 can schedule data transmission in accordance with the appropriate PMI for the single-cell communication and the appropriate PMI for the multi-cell communication. The primary base station 101 thus increases transmission performance. It is not necessary to specify each of the codebook subset for the single-cell communication and the codebook subset for the multi-cell communication, and the precoding process for the single-cell communication and the multi-cell communication is optimized.

In another example of the first embodiment of the present invention, the codebook subset for the single-cell communication and the codebook subset for the multi-cell communication are independently pre-specified, and the primary base station may configure the terminal 103 with the codebook subset restriction information common to the single-cell communication and the multi-cell communication. In this example, the number of codebooks for the single-cell communication is preferably set to be equal to the number of codebooks for the multi-cell communication.

Figure 11:
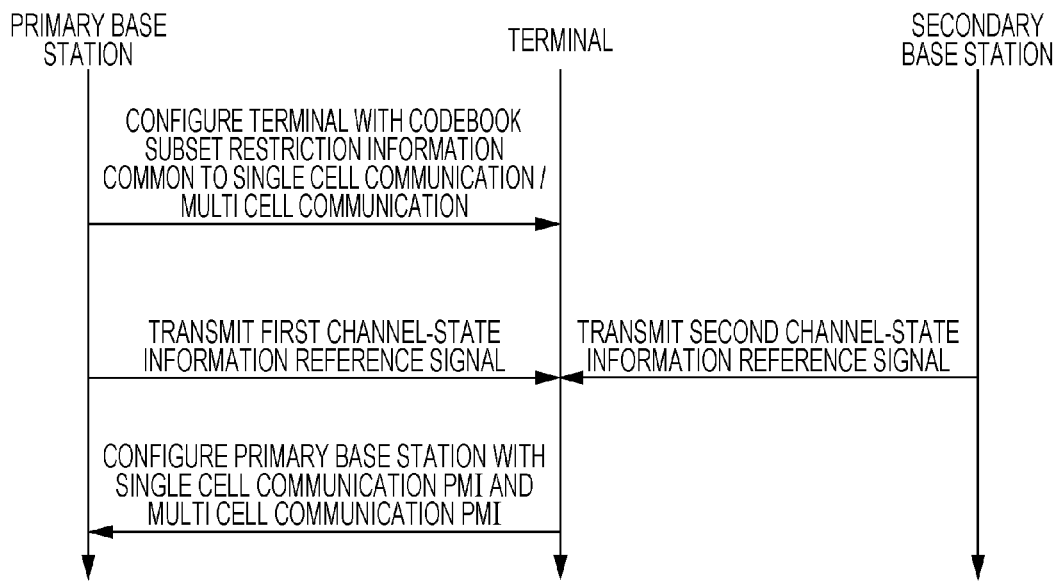
FIG. 11 illustrates an example of the configuration procedure of the control information of the first embodiment of the present invention.

FIG. 11 illustrates an example of the configuration procedure of the control information of the first embodiment of the present invention. The primary base station 101 configures the terminal 103 with the codebook subset restriction information common to the single-cell communication/the multi-cell communication. In response to the restricting information, the terminal 103 sets the selectable codebook subset as the PMI for the single-cell communication and the selectable codebook subset as the PMI for the multi-cell communication, from among the pre-specified codebook subsets for the single-cell communication and the pre-specified codebook subsets for the multi-cell communication. The primary base station 101 transmits the first channel-state information reference signal to the terminal 103 while the secondary base station 102 transmits the second channel-state information reference signal to the terminal 103. Using these channel-state information reference signals, the terminal 103 measures each channel state, and then selects appropriate PMI for the single-cell communication and appropriate PMI for the multi-cell communication, from among the selectable codebook subsets as the set PMIs. The terminal 103 configures the primary base station 101 with the selected appropriate PMI for the single-cell communication and the selected appropriate PMI for the multi-cell communication. In response to each of the configured PMIs, the primary base station 101 schedules data transmission to the terminal 103.

Using the above-described method, the primary base station 101 can schedule data transmission in accordance with the appropriate PMI for the single-cell communication and the appropriate PMI for the multi-cell communication. The primary base station 101 thus increases transmission performance. Since the codebook subset restriction information common to the single-cell communication and the multi-cell communication is used, the precoding process to the single-cell communication and the multi-cell communication is optimized without any increase in the overhead of the control information.

In yet another example of the first embodiment of the present invention, the primary base station 101 may configure the terminal 103 with the codebook subset restriction information for the communication with the secondary base station (second communication) in addition to the codebook subset restriction information for the communication with the primary base station (first communication). In this example, the codebook subset common to the primary base station and the secondary base station is used.

Figure 12:
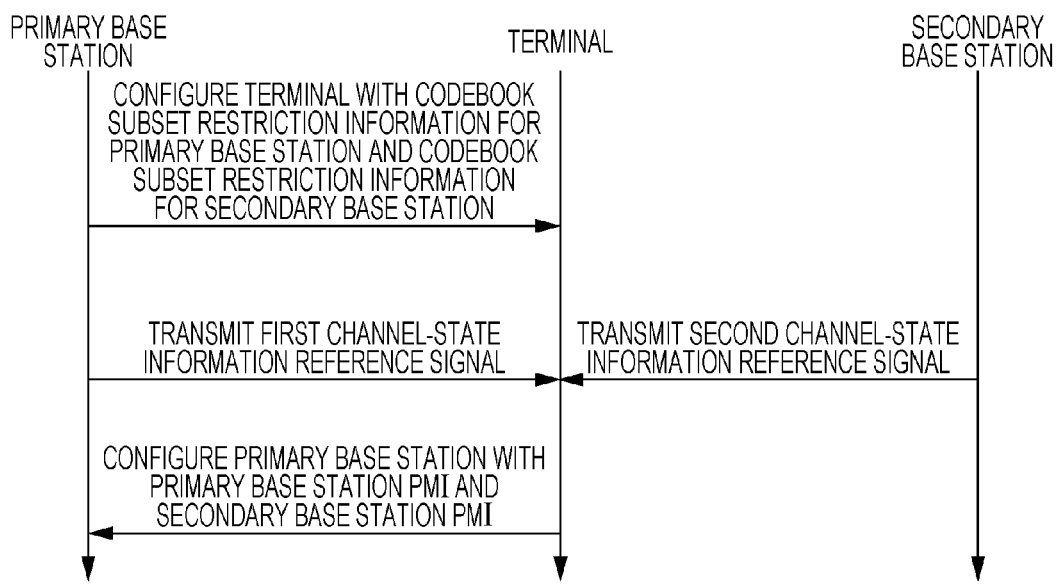
FIG. 12 illustrates an example of the configuration procedure of the control information of the first embodiment of the present invention.

FIG. 12 illustrates an example of the configuration procedure of the control information of the first embodiment of the present invention. The primary base station 101 configures the terminal 103 with the codebook subset restriction information for the primary base station and the codebook subset restriction information for the secondary base station. In response to the restricting information, the terminal 103 sets the selectable codebook subset as the PMI for the primary base station and the selectable codebook subset as the PMI for the secondary base station 102, from among the pre-specified codebook subsets common to the primary base station/the secondary base station. The primary base station 101 transmits the first channel-state information reference signal to the terminal 103 while the secondary base station 102 transmits the second channel-state information reference signal to the terminal 103. Using these channel-state information reference signals, the terminal 103 measures each channel state, and then selects appropriate PMI for the primary base station and appropriate PMI for the terminal, from among the selectable codebook subsets as the set PMIs. The terminal 103 configures the primary base station 101 with the selected appropriate PMI for the primary base station and the selected appropriate PMI for the secondary base station. In response to each of the configured PMIs, the primary base station 101 schedules data transmission to the terminal 103.

Using the above-described method, the primary base station 101 may schedule data transmission in accordance with the appropriate PMI for the primary base station and the appropriate PMI for the secondary base station. The primary base station 101 thus increases transmission performance. It is not necessary to specify each of the codebook subset for the primary base station and the codebook subset for the secondary base station, and the precoding process for the single-cell communication and the multi-cell communication is optimized.

In another example of the first embodiment of the present invention, the codebook subset for the primary base station and the codebook subset for the secondary base station may be independently pre-specified, and the primary base station may configure the terminal with the codebook subset restriction information common to the primary base station and the secondary base station. In this example, the number of codebooks for the primary base station is preferably set to be equal to the number of codebooks for the secondary base station.

The primary base station 101 configures the terminal 103 with the codebook subset restriction information common to the primary base station/the secondary base station 102. In response to the restricting information, the terminal 103 sets the selectable codebook subset as the PMI for the primary base station and the selectable codebook subset as the PMI for the secondary base station, from among the pre-specified codebook subsets for the primary base station and the pre-specified codebook subsets for the secondary base station. The primary base station 101 transmits the first channel-state information reference signal to the terminal 103 while the secondary base station 102 transmits the second channel-state information reference signal to the terminal 103. Using these channel-state information reference signals, the terminal 103 measures each channel state, and then selects appropriate PMI for the primary base station and appropriate PMI for the secondary base station, from among the selectable codebook subsets as the set PMIs. The terminal 103 configures the primary base station 101 with the selected appropriate PMI for the selected primary base station and the selected appropriate PMI for the selected secondary base station. In response to each of the configured PMIs, the primary base station 101 schedules data transmission to the terminal 103.

Using the above-described method, the primary base station 101 can schedule data transmission in accordance with the appropriate PMI for the primary base station and the appropriate PMI for the secondary base station. The primary base station 101 thus increases transmission performance. Since the codebook subset restriction information common to the primary base station and the secondary base station is used, the precoding process to the primary base station and the secondary base station is optimized without any increase in the overhead of the control information.

The codebook subset restriction information is control information unique to each base station, and may be information with which the primary base station 101 has configured the terminal. In the configuration method, the primary base station 101 includes the codebook subset restriction information in configuration information (BCH (Broadcast Channel), MIB (Master Information Block), SIB (System Information Block) or the like).

The codebook subset restriction information is information that is set on a per codebook basis, but may be set on a per group basis with each group including a plurality of codebooks. More specifically, the codebook subset restriction information may be information that is set for a group formed of all or some of the codebooks on a per rank basis. For example, W10 and W12 as discussed with reference to FIG. 8 are grouped together, and W11 and W13 as discussed with reference to FIG. 8 are grouped together. Alternatively, the codebook subset restriction information may be information that is set for a group formed of all or some of the codebooks across a plurality of ranks. For example, W11 and W21 as discussed with reference to FIG. 8 are grouped together, and W12 and W22 as discussed with reference to FIG. 8 are grouped together. With a plurality of codebooks grouped, the overhead of the codebook subset restriction information is reduced.

Second Embodiment

According to the first embodiment, the configuration of a plurality of PMIs is performed in accordance with a plurality of codebook subsets. According to a second embodiment of the present invention, the configuration of a selected PMI is performed in accordance with a plurality of codebook subsets. The second embodiment of the present invention is described with reference to the drawings.

FIG. 13 is a schematic block diagram illustrating a configuration of a feedback information generator 404 of the second embodiment of the present invention. As illustrated in FIG. 13, the feedback information generator 404 includes a channel-state measuring unit 1301, a feedback information computing unit 1302, and a selector 1303.

Using the received channel-state information reference signal, the channel-state measuring unit 1301 measures, on a per base station basis, the channel state of the transmit antenna of each base station with respect to the receive antenna of the terminal 103, and generates the channel-state measurement value on a per base station basis. Next, the feedback information computing unit 1302 calculates the feedback information in accordance with the generated channel state estimation value. In this process, the feedback information computing unit 1302 receives the codebook subset restriction information included in a signal such as the control information signal, and then accounts for the codebook subset restriction information in the calculation of the feedback information.

In an example of the second embodiment of the present invention, the primary base station 101 may configure the terminal 103 with the codebook subset restriction information for the multi-cell communication in addition to the codebook subset restriction information for the single-cell communication. In this example, the codebook subset restriction information common to the single-cell communication and the multi-cell communication is used. Furthermore, the primary base station 101 can configure the terminal 103 with indicating information expressly (explicitly). The indicating information indicates the codebook subset restriction information for the multi-cell communication or the codebook subset restriction information for the single-cell communication.

FIG. 14 illustrates an example of a configuration procedure of the control information of the second embodiment of the present invention. The primary base station 101 configures the terminal 103 with the codebook subset restriction information for the single-cell communication and the codebook subset restriction information for the multi-cell communication. Furthermore, the primary base station 101 configures the terminal 103 with the indicating information of the codebook subset restriction information. The indicating information serves as information that indicates the codebook subset restriction information to be used by the terminal 103. In response to these pieces of restricting information and the indicating information, the terminal 103 sets the selectable codebook subset as PMI for the single-cell communication or the selectable codebook subset as PMI for the multi-cell communication from among the pre-specified codebook subsets common to the single-cell communication/the multi-cell communication. The primary base station 101 transmits the first channel-state information reference signal to the terminal 103 while the secondary base station 102 transits the second channel-state information reference signal to the terminal 103. Using these channel-state information reference signals, the terminal 103 measures each channel state, and then selects appropriate PMI for the single-cell communication or appropriate PMI for the multi-cell communication, from among the selectable codebook subsets as the set PMIs. The terminal 103 configures the primary base station 101 with the selected appropriate PMI for the single-cell communication or the selected appropriate PMI for the multi-cell communication. In response to the configured PMI, the primary base station 101 schedules data transmission to the terminal 103.

Using the above-described method, the primary base station 101 may cause the appropriate PMI for the single-cell communication or the appropriate PMI for the multi-cell communication to be fed back, without an increase in the overhead of the feedback information from the terminal 103. Since this arrangement leads to efficient scheduling, transmission performance is increased. It is not necessary to specify each of the codebook subset for the single-cell communication and the codebook subset for the multi-cell communication, and the precoding process for the single-cell communication and the multi-cell communication is optimized.

In another example of the second embodiment of the present invention, the primary base station 101 may configure the terminal 103 with the codebook subset restriction information for the multi-cell communication in addition to the codebook subset restriction information for the single-cell communication. In this example, the codebook subset common to the single-cell communication and the multi-cell communication is used. Furthermore, the primary base station 101 may impliedly (implicitly) specify the configured codebook subset restriction information for the single-cell communication or the configured subset restricting information for the multi-cell communication by associating these pieces of information with other control information.

Figures 15, 16:
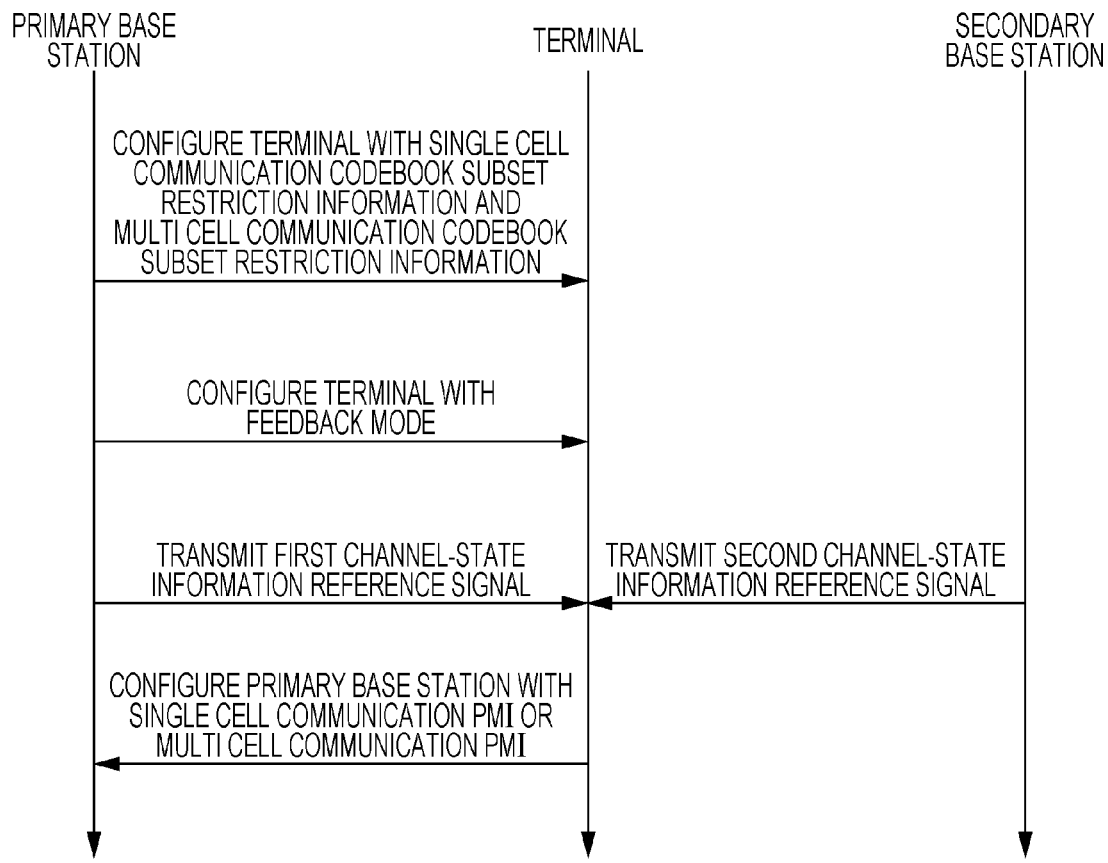
FIG. 15 illustrates an example of the configuration procedure of control information of the second embodiment of the present invention.
FIG. 16 illustrates an example of measuring subframe identity information of the second embodiment of the present invention.

FIG. 15 illustrates an example of the configuration procedure of control information of the second embodiment of the present invention. The primary base station 101 configures the terminal 103 with the codebook subset restriction information for the single-cell communication and the codebook subset restriction information for the multi-cell communication. Furthermore, the primary base station 101 configures the terminal 103 with a feedback mode. In response to the feedback mode, the primary base station 101 then pre-specifies the codebook subset restriction information to be used. For example, upon being configured with the appropriate feedback mode for the single-cell communication, the terminal 103 uses the codebook subset restriction information for the single-cell communication. Upon being configured with the codebook subset restriction information for the multi-cell communication, the terminal 103 uses the codebook subset restriction information for the multi-cell communication. More specifically, the configured codebook subset restriction information for the single-cell communication or the configured codebook subset restriction information for the multi-cell communication is specified by associating these pieces of information with the other control information. In response to these pieces of restricting information and the codebook subset restriction information, the terminal 103 sets the selectable codebook subset as PMI for the single-cell communication or the selectable codebook subset as PMI for the multi-cell communication from among the pre-specified codebook subsets common to the single-cell communication/the multi-cell communication. The primary base station 101 transmits the first channel-state information reference signal to the terminal 103 while the secondary base station 102 transits the second channel-state information reference signal to the terminal 103. Using these channel-state information reference signals, the terminal 103 measures each channel state, and then selects appropriate PMI for the single-cell communication or appropriate PMI for the multi-cell communication, from among the selectable codebook subsets as the set PMIs. The terminal 103 configures the primary base station 101 with the selected appropriate PMI for the single-cell communication or the selected appropriate PMI for the multi-cell communication. In response to the configured PMI, the primary base station 101 schedules data transmission to the terminal 103.

The feedback mode as well as a transmission mode, transmit power control information, retransmission control information, and adaptive modulation information may be used as the control information with which the codebook subset restriction information to be used by the terminal 103 is associated. The codebook subset restriction information to be used by the terminal 103 is associated with not only the control information with which the primary base station 101 has configured the terminal 103, but also control information including terminal category information (UE category) or terminal capability information (UE capability) of the terminal 103, or control information and type (attribute and state) of the base station (cell).

Using the above-described method, the primary base station 101 may cause the appropriate PMI for the single-cell communication or the appropriate PMI for the multi-cell communication to be fed back, without an increase in the overhead of the feedback information from the terminal 103. Since this arrangement leads to efficient scheduling, transmission performance is increased. It is not necessary to specify each of the codebook subset for the single-cell communication and the codebook subset for the multi-cell communication, and the precoding process for the single-cell communication and the multi-cell communication is optimized.

In another example of the second embodiment of the present invention, the primary base station 101 may configure the terminal 103 with the codebook subset restriction information for the multi-cell communication in addition to the codebook subset restriction information for the single-cell communication. In this example, the codebook subset common to the single-cell communication and the multi-cell communication is used. Furthermore, the primary base station 101 may configure the terminal 103 of identity information that specifies a subframe where the codebook subset restriction information for the single-cell communication is used, and identity information that specifies a subframe where the codebook subset restriction information for the multi-cell communication is used.

FIG. 16 illustrates an example of measuring subframe identity information (measuring subframe information) of the second embodiment of the present invention. The measuring subframe identity information is information that specifies a subframe that uses the codebook subset restriction information. Specifically, the measuring subframe identity information is 1-bit information in the bitmap format on every subframe. In other words, if the measuring subframe identity information is "1", the corresponding codebook subset restriction information is used in the subframe. If the measuring subframe identity information is "0", the corresponding codebook subset restriction information is not used in the subframe. FIG. 16 illustrates the measuring subframe identity information for the single-cell communication and the measuring subframe identity information for the multi-cell communication at subframe indexes 0 through 9. In other words, the measuring subframe identity information for the single-cell communication is used at subframe indexes of 0, 3, and 7. The measuring subframe identity information for the multi-cell communication is used at subframe indexes 2, 4, 5, and 9. In this example, the measuring subframe identity information is repeatedly used every 10 subframes with 10 subframes serving as a unit. Alternatively, only one type of measuring subframe identity information may be set and that measuring subframe identity information may specify one of the measuring subframe identity information for the single-cell communication and the measuring subframe identity information for the multi-cell communication.

Figures 17, 18:
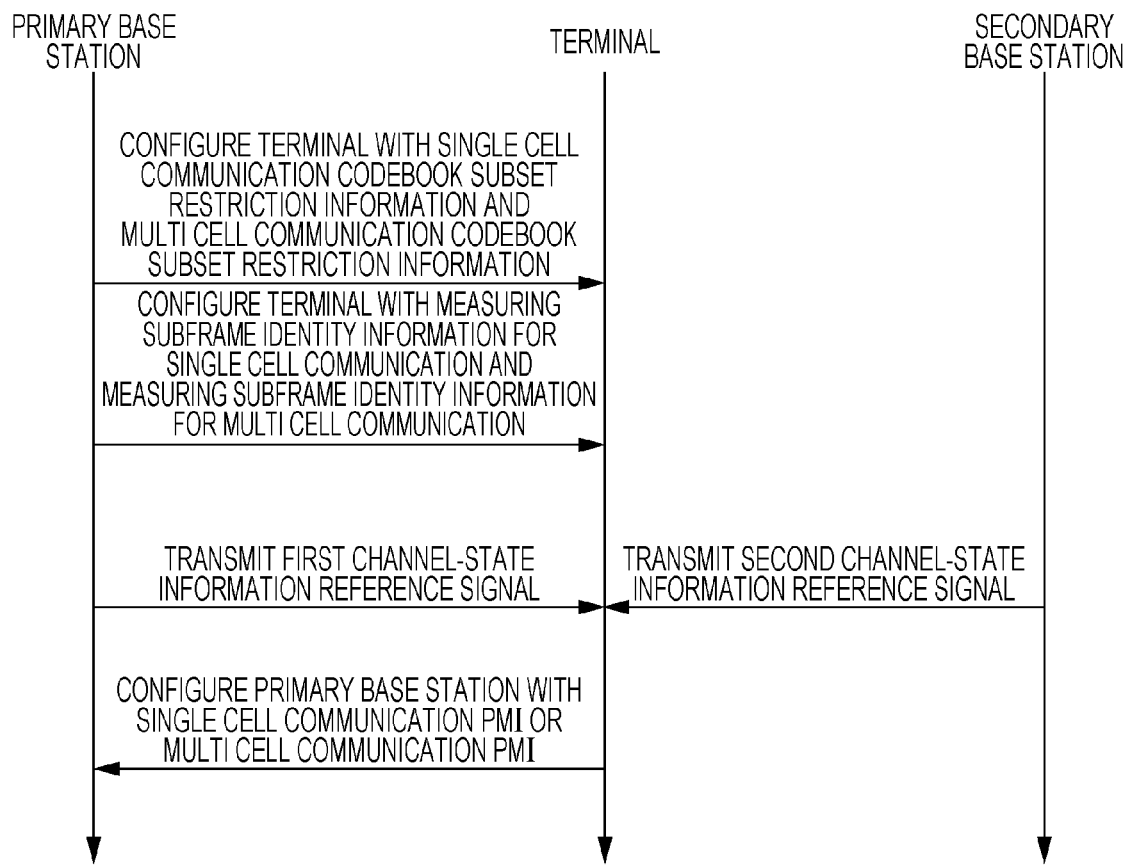
FIG. 17 illustrates an example of the configuration procedure of the control information of the second embodiment of the present invention.
FIG. 18 illustrates an example of codebook subset power offset information of a third embodiment of the present invention.

FIG. 17 illustrates an example of the configuration procedure of the control information of the second embodiment of the present invention. The primary base station 101 configures the terminal 103 with the codebook subset restriction information for the single-cell communication and the codebook subset restriction information for the multi-cell communication. Furthermore, the primary base station 101 configures the terminal 103 with the measuring subframe identity information for the single-cell communication and the measuring subframe identity information for the multi-cell communication. In response to these pieces of restricting information and the subframe indexes corresponding thereto, the terminal 103 sets the selectable codebook subset as PMI for the single-cell communication or the selectable codebook subset as PMI for the multi-cell communication from among the pre-specified codebook subsets common to the single-cell communication/the multi-cell communication. The subframe herein may be a subframe that the terminal 103 is instructed to feed back to the primary base station 101. Also, the subframe herein may be a subframe that the terminal 103 feeds back to the primary base station 101. The subframe herein may be a subframe that includes the first embodiment of the present invention transmitted by the primary base station 101 and the second embodiment of the present invention transmitted by the secondary base station 102. The primary base station 101 transmits the first channel-state information reference signal to the terminal 103 while the secondary base station 102 transits the second channel-state information reference signal to the terminal 103. Using these channel-state information reference signals, the terminal 103 measures each channel state, and then selects appropriate PMI for the single-cell communication or appropriate PMI for the multi-cell communication, from among the selectable codebook subsets as the set PMIs. The terminal 103 configures the primary base station 101 with the selected appropriate PMI for the single-cell communication or the selected appropriate PMI for the multi-cell communication. In response to the configured PMI, the primary base station 101 schedules data transmission to the terminal 103.

Using the above-described method, the primary base station 101 may cause the appropriate PMI for the single-cell communication or the appropriate PMI for the multi-cell communication to be fed back, without an increase in the overhead of the feedback information from the terminal 103. Since this arrangement leads to efficient scheduling, transmission performance is increased. It is not necessary to specify each of the codebook subset for the single-cell communication and the codebook subset for the multi-cell communication, and the precoding process for the single-cell communication and the multi-cell communication is optimized.

In the example described above, the master station configures the terminal with the codebook subset restriction information for the single-cell communication and the codebook subset restriction information for the multi-cell communication, and these pieces of restricting information are applied to the pre-specified codebook subset common to the single-cell communication/the multi-cell communication. The present invention is not limited to this arrangement. For example, the codebook subset for the single-cell communication and the codebook subset for the multi-cell communication are pre-specified, and the base station configures the terminal with the codebook subset restriction information common to the single-cell communication/the multi-cell communication, and then the codebook subset restriction information is applied.

Using the above-described method, the primary base station 101 may cause the appropriate PMI for the single-cell communication or the appropriate PMI for the multi-cell communication to be fed back, without an increase in the overhead of the feedback information from the terminal 103. Since this arrangement leads to efficient scheduling, transmission performance is increased. Since the codebook subset restriction information common to the single-cell communication and the multi-cell communication is used, the precoding process for the single-cell communication and the multi-cell communication is optimized without an increase in the overhead of the control information.

In the example described above, the master station configures the terminal with the codebook subset restriction information for the single-cell communication and the codebook subset restriction information for the multi-cell communication, and the terminal applies these pieces of restricting information to the pre-specified codebook subset common to the single-cell communication/the multi-cell communication. The present invention is not limited to this arrangement. For example, the master station configures the terminal with the codebook subset restriction information for the primary base station and the codebook subset restriction information for the secondary base station, and the terminal applies these pieces of restricting information to the pre-specified codebook subset common to the primary base station/the secondary base station.

Using the above-described method, the primary base station 101 may cause the appropriate PMI for the primary base station or the appropriate PMI for the secondary base station to be fed back, without an increase in the overhead of the feedback information from the terminal 103. Since this arrangement leads to efficient scheduling, transmission performance is increased. It is not necessary to specify each of the codebook subset for the primary base station and the codebook subset for the secondary base station, and the precoding process for the primary base station and the secondary base station is optimized.

In the example described above, the master station configures the terminal with the codebook subset restriction information for the single-cell communication and the codebook subset restriction information for the multi-cell communication, and the terminal applies these pieces of restricting information to the pre-specified codebook subset common to the single-cell communication/the multi-cell communication. The present invention is not limited to this arrangement. For example, the codebook subset for the single-cell communication and the codebook subset for the multi-cell communication are pre-specified, and the base station configures the terminal with the codebook subset restriction information common to the single-cell communication/the multi-cell communication, and then the terminal applies the codebook subset restriction information to the pre-specified codebook subset.

Using the above-described method, the primary base station 101 may cause the appropriate PMI for the primary base station or the appropriate PMI for the secondary base station to be fed back, without an increase in the overhead of the feedback information from the terminal 103. Since this arrangement leads to efficient scheduling, transmission performance is increased. Since the codebook subset restriction information common to the primary base station and the secondary base station is used, the precoding process for the primary base station and the secondary base station is optimized without an increase in the overhead of the control information.

Third Embodiment

According to the first embodiment, whole or part of the codebook subset in operation is restricted using the codebook subset restriction information. A third embodiment of the present invention describe below relates to a method that controls a probability, at which whole or part of the codebook subset is selected as PMI, using codebook subset power offset information.

In the third embodiment of the present invention, the primary base station 101 configures the terminal 103 with the codebook subset power offset information as part of the control information.

FIG. 18 illustrates an example of the codebook subset power offset information of the third embodiment of the present invention. As illustrated in FIG. 18, the codebook subset power offset information of 2 bits represents four types of power offset values. The primary base station 101 can set a power offset value to the terminal 103 on a per codebook basis, and control on a per codebook basis the probability at which the terminal 103 selects the codebook subset as PMI. For example, to increase the probability of the selection of a target codebook, the primary base station 101 sets a power offset value of the codebook to be higher. To decrease the probability of the selection of the target codebook, the primary base station 101 sets the power offset value of the codebook to be lower. To prevent the target codebook from being selected, the primary base station 101 sets the power offset value of the codebook to be at a minimum.

Figure 19:
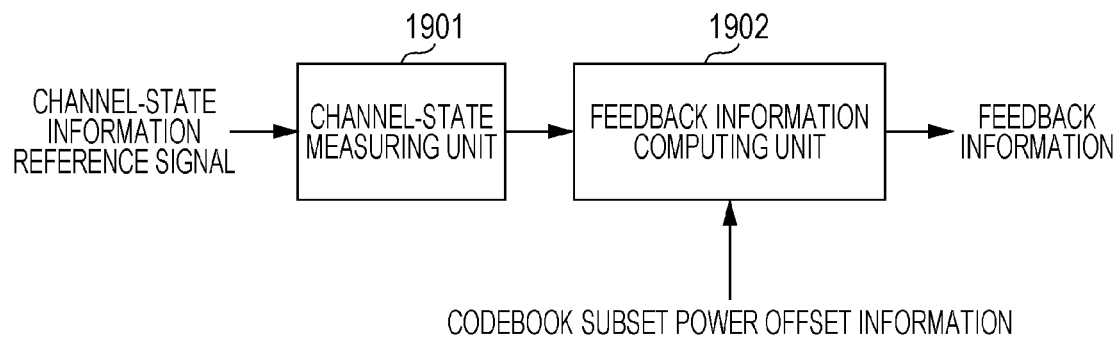
FIG. 19 is a schematic diagram illustrating a configuration of a feedback information generator 404 of the third embodiment of the present invention.
Figure 20:
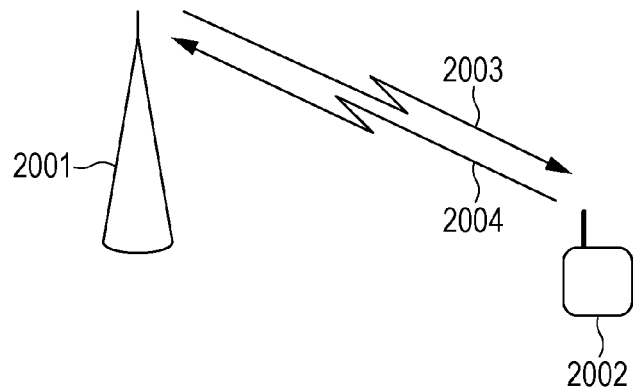
FIG. 20 schematically illustrates an example of adaptive control that is performed to transmit data in a downlink in a single-cell communication.

FIG. 19 is a schematic diagram illustrating a configuration of a feedback information generator 404 of the third embodiment of the present invention. In FIG. 19, the feedback information generator 404 includes a channel-state measuring unit 1901 and a feedback information computing unit 1902.

The channel-state measuring unit 1901 measures the channel state of the transmit antenna of each base station with respect to the receive antenna of the terminal 103 using the received channel-state information reference signal, and generates the channel state estimation value of each base station. Next, the feedback information computing unit 1902 computes the feedback information in accordance with the generated channel state estimation value. The feedback information computing unit 1902 then receives the codebook subset power offset information contained in the control information signal, and accounts for the codebook subset power offset information in the computation of the feedback information.

In the computation of the target codebook, the feedback information computing unit 1902 performs a power offset control process on the channel state estimation value measured by the channel-state measuring unit, using the power offset value of the codebook. If the power offset value is 3 dB, power of the channel state estimation value subsequent to offset is increased by 3 dB. If the power offset value is −3 dB, power of the channel state estimation value subsequent to offset is decreased by 3 dB. If the power offset value is 0 (true value), power of the channel state estimation value subsequent to offset is 0 and that codebook is not selected.

In accordance with the method of the third embodiment of the present invention, the primary base station 101 controls the probability at which the terminal 103 selects the codebook subset as PMI. For this reason, the primary base station 101 increases the freedom of scheduling on the terminal 103, thereby increasing transmission performance.

As described with reference to the first embodiment and second embodiment of the present invention, the method of the third embodiment of the present invention is equally applicable when a plurality of codebook subsets, i.e., the codebook subsets for the single-cell communication/the multi-cell communication, or the codebook subsets for the primary base station/the secondary base station are present.

The codebook subset power offset information is information that is set on a per codebook basis, but may be set on a per group basis with each group including a plurality of codebooks. More specifically, the codebook subset power offset information may be information that is set for a group formed of all or some of the codebooks on a per rank basis. For example, W10 and W12 as discussed with reference to FIG. 8 are grouped together, and W11 and W13 as discussed with reference to FIG. 8 are grouped together. Alternatively, the codebook subset power offset information may be information that is set for a group formed of all or some of the codebooks across a plurality of ranks. For example, W11 and W21 as discussed with reference to FIG. 8 are grouped together, and W12 and W22 as discussed with reference to FIG. 8 are grouped together. With a plurality of codebooks grouped, the overhead of the codebook subset power offset information is reduced.

In each of the embodiments, the primary base station 101 and the secondary base station 102 perform communications in a cooperative fashion. The base station herein can be a physical base-station apparatus in a cellular system. Furthermore, a combination of transmitter apparatuses (including a relay apparatus) that coordinate with each other by extending a link to cells (a first transmitter apparatus and a second transmitter apparatus), or a combination of transmitter apparatuses coordinate with each other by transmitting the channel-state information reference signals via mutually different antenna ports (a first port and a second port) can be each of the primary base station 101 and the secondary base station 102. With this arrangement, the same advantages as those of the above-described embodiments are provided. The primary base station 101 may be a base-station apparatus in the cellular system, and the secondary base station 102 may be a transmitter apparatus (such as RRU (Remote Radio Unit), RRE (Remote Radio Equipment), and Distributed Antenna) that operates under the control of the primary base station 101. Conversely, the secondary base station 102 may be a transmitter apparatus in the cellular system, and the primary base station 101 may be a transmitter apparatus that operates under the control of the secondary base station 102. Alternatively, both the primary base station 101 and the secondary base station 102 may be transmitter apparatuses that operate under the control of a physical base-station apparatus in the cellular system.

In each of the embodiments, the secondary base station 102 is adjacent to the primary base station 101 in the cooperative communication between the primary base station 101 and the secondary base station 102. The present invention is not limited to this arrangement. For example, the same advantages described with reference to the embodiments are provided in a heterogeneous network where the communication coverage area of the primary base station 101 entirely or partially overlaps the communication coverage area of the secondary base station 102. In such a case, the component carriers of the base stations (carrier frequencies) may entirely or partially overlap each other. More specifically, the primary base station 101 may be a macro cell, and the secondary base station 102 may be a picocell or femtocell (Home eNodeB) smaller in communication coverage area than the macrocell. The communication coverage area of the secondary base station 102 is thus within the communication coverage area of the primary base station 101.

In each of the embodiments, the resource element or the resource block is used as a mapping unit of the information data signal, the control information signal, PDSCH, PDCCH, and the reference signal. The subframe or radio frame is used as a transmission unit in the time direction. The present invention is not limited to this arrangement. The same advantages may be provided even if an area formed of any frequency and time and unit of time are substituted for the resource element or the resource block and the subframe or the radio frame. In each of the embodiments, demodulation is performed using precoding processed RS, and the port corresponding to the precoding processed RS is a port equivalent to an MIMO layer. The present invention is not limited to this arrangement. The same advantages are provided by applying the present invention to ports corresponding to mutually different reference signals. For example, an Unprecoded RS rather than a Precoded RS may be used, and a port equivalent to an output terminal subsequent to the precoding process or a port equivalent to a physical antenna (or a combination of physical antennas) may be used.

A program running on the primary base station 101, the secondary base station 102, and the terminal 103 of the present invention is a program that controls CPU or the like (to cause a computer to function) so that the function of the embodiments of the present invention is performed. The information handled by these apparatuses is temporarily stored on a RAM during the process of the information, then stored on a variety of ROMs or HDD, read by the CPU as necessary, for modification and writing. A storage medium storing the program can be any of a semiconductor medium (such as ROM, or a non-volatile memory card), an optical recording medium (such as DVD, MO, MD, CD, or BD), or a magnetic recording medium (such as a magnetic tape, or a flexible disk). The function of the embodiments is performed by executing the loaded program. The function of the embodiments can also be performed by performing an operating system in response to the instruction of the program or in conjunction with an operating system or another application program.

To circulate the program in the market, the program may be supplied in a stored state on a portable recording medium, or is transferred to a server computer via a network such as the Internet. In such a case, a storage device in the server computer also falls within the scope of the present invention. Whole or part of the primary base station 101, the secondary base station 102, and the terminal 103 may be implemented as LSI as a typical integrated circuit. Each function block in the primary base station 101, the secondary base station 102, and the terminal 103 may be individually integrated into a chip. Alternatively, all or some of the function blocks may be integrated into a chip. The integrated form may not be limited to LSI. The integrated form may be a dedicated circuit, or a general-purpose processor. If a technique of circuit integration replacing the LSI appears with the advance of semiconductor technique, an integrated circuit resulting from the technique may also be used.

The embodiments of the present invention have been described in detail with reference to the drawings. A specific structure of each embodiment is not limited to the structures described above. A variety of design changes is possible without departing from the scope of the present invention. A variety of modification is possible without departing from the scope of the prevent invention defined by the claims. An embodiment resulting from combining technical means disclosed in the different embodiments may also fall within the scope of the present invention. The embodiments include elements that may have similar functions, and if an embodiment is constructed by interchanging the elements having the similar functions, such an embodiment may also falls within the scope of the present invention.

INDUSTRIAL APPLICABILITY

The present invention is preferable for use in a radio base-station apparatus, a radio terminal apparatus, a radio communication system, and a radio communication method.

REFERENCE SIGNS LIST 101 primary base station, 102 secondary base station, 103 terminal, 104 and 105 downlinks, 106 uplink, 201 and 301 transmit signal generators, 202 first channel-state information reference signal multiplexer, 203, 303, and 405 transmitters, 204 and 401 receivers, 205 feedback information processor, 206, 304, and 406 higher layers, 302 second channel-state information reference signal multiplexer, 402 receive signal processor, 403 data signal processor, 404 feedback information generator, 501, 1301, and 1901 channel-state measuring units, 502, 1302, and 1902 feedback information computing units, 1303 selector, 2001 base station, 2002 terminal, 2003 downlink, 2004 uplink

The invention claimed is:

1. A base-station apparatus in communication with a terminal apparatus, comprising:
   a higher layer circuit configured to provide, to the terminal apparatus, a first codebook subset restriction information which indicates a precoder which is not allowed for a precoding matrix indicator reporting and a second codebook subset restriction information which indicates a precoder which is not allowed for a precoding matrix indicator reporting; and
   a reception circuit configured to receive a first channel state information report based on the first codebook subset restriction information and a second channel state information report based on the second codebook subset restriction information, wherein
   the reception circuit is configured to receive, based on a downlink control information for the terminal apparatus, the first channel state information report or the second channel state information report, and
   the first channel state information report is based on a first channel state information reference signal, and the second channel state information report is based on a second channel state information reference signal.

2. The base-station apparatus according to claim 1, wherein
   the higher layer circuit includes a processing device and a memory device which are programmed to cause the processing device to provide, to the terminal apparatus, the first codebook subset restriction information and the second codebook subset restriction information which indicate the precoder which is not allowed for the precoding matrix indicator reporting; and
   the reception circuit includes a processing device and a memory device which are programmed to cause the processing device of the reception circuit to receive the first channel state information report based on the first codebook subset restriction information or the second channel state information report based on the second codebook subset restriction information.

3. The base-station apparatus according to claim 1, wherein the first channel state information report is based on a first measurement subframe information, and the second channel state information report is based on a second measurement subframe information.

4. A terminal apparatus in communication with a base-station apparatus, comprising:
   a higher layer circuit configured to be provided, from the base-station apparatus, with a first codebook subset restriction information which indicates a precoder which is not allowed for a precoding matrix indicator reporting and a second codebook subset restriction information which indicates a precoder which is not allowed for a precoding matrix indicator reporting; and
   a transmission circuit configured to transmit a first channel state information report based on the first codebook subset restriction information and a second channel state information report based on the second codebook subset restriction information, wherein
   the transmission circuit is configured to transmit, based on a downlink control information for the terminal apparatus, the first channel state information report or the second channel state information report, and
   the first channel state information report is based on a first channel state information reference signal, and the second channel state information report is based on a second channel state information reference signal.

5. The terminal apparatus according to claim 4, wherein
   the higher layer circuit includes a processing device and a memory device which are programmed to cause the processing device to be provided, from the base-station apparatus, with the first codebook subset restriction information and the second codebook subset restriction information which indicate the precoder which is not allowed for the precoding matrix indicator reporting; and
   the transmission circuit including a processing device and a memory device which are programmed to cause the processing device of the transmission circuit to transmit the first channel state information report based on the first codebook subset restriction information or the second channel state information report based on the second codebook subset restriction information.

6. The terminal apparatus according to claim 4, wherein the first channel state information report is based on a first measurement subframe information, and the second channel state information report is based on a second measurement subframe information.

7. A communication method of a terminal apparatus in communication with a base-station apparatus, the method comprising:
   a step of being configured with, from the base-station apparatus, a first codebook subset restriction information which indicates a precoder which is not allowed for a precoding matrix indicator reporting and a second codebook subset restriction information which indicates a precoder which is not allowed for a precoding matrix indicator reporting; and
   a step of transmitting a first channel state information report based on the first codebook subset restriction information and a second channel state information report based on the second codebook subset restriction information, wherein
   the step of transmitting the first channel state information report or the second channel state information report comprises transmitting, based on a downlink control information for the terminal apparatus, the first channel state information report or the second channel state information report, and
   the first channel state information report is based on a first channel state information reference signal, and the second channel state information report is based on a second channel state information reference signal.

* * * * *